(12) United States Patent
Roberts

(10) Patent No.: US 10,792,631 B2
(45) Date of Patent: Oct. 6, 2020

(54) TAP AND AERATOR APPARATUS

(71) Applicant: AMNITY LLC, Costa Mesa, CA (US)

(72) Inventor: Nathaniel T. Roberts, Costa Mesa, CA (US)

(73) Assignee: AMNITY, LLC, Costa Mesa, CA (US)

( * ) Notice: Subject to any disclaimer, the term of this patent is extended or adjusted under 35 U.S.C. 154(b) by 0 days.

(21) Appl. No.: 15/716,187

(22) Filed: Sep. 26, 2017

(65) Prior Publication Data

US 2018/0056259 A1   Mar. 1, 2018

Related U.S. Application Data

(63) Continuation-in-part of application No. 14/846,206, filed on Sep. 4, 2015, now abandoned.
(Continued)

(51) Int. Cl.
*B01F 15/02* (2006.01)
*B01F 5/04* (2006.01)
(Continued)

(52) U.S. Cl.
CPC ........ *B01F 15/026* (2013.01); *B01F 3/04794* (2013.01); *B01F 5/0426* (2013.01);
(Continued)

(58) Field of Classification Search
CPC ....... B67D 3/045; B67D 3/043; B01F 15/026; B01F 15/0429; B01F 5/0426;
(Continued)

(56) References Cited

U.S. PATENT DOCUMENTS 3,730,224 A * 5/1973 Prisk .................. F16K 1/32
  137/625.33
4,724,074 A   8/1988 Schaupp
(Continued)

FOREIGN PATENT DOCUMENTS

GB   1 227 337         4/1971
GB   2333288      *   7/1999
(Continued)

OTHER PUBLICATIONS

Search Report issued by the European Patent Office, dated Apr. 23, 2020, for related EP Patent Application No. 17845147.0 (Year: 2020).*

(Continued)

*Primary Examiner* — Stephen Hobson
(74) *Attorney, Agent, or Firm* — Greer Burns & Crain, Ltd.

(57) ABSTRACT

A tap apparatus including a container coupling portion including a liquid inlet portion, a body portion, and a plug valve portion. The body portion includes a liquid outlet portion, wherein the liquid outlet portion is in fluid communication with the liquid inlet portion of the container coupling portion. The plug valve portion is configured and arranged to be seated within the body portion, wherein the plug valve portion is configured and arranged to be moved relative to the body portion between an open position, in which a liquid is free to flow from the liquid inlet portion and out through the liquid outlet portion, and a closed position, in which liquid from the liquid inlet portion is prevented from flowing out through the liquid outlet portion. The body portion also includes a plurality of flow channels provided in an interior surface thereof.

18 Claims, 20 Drawing Sheets

Related U.S. Application Data

(60) Provisional application No. 62/400,335, filed on Sep. 27, 2016, provisional application No. 62/399,687, filed on Sep. 26, 2016, provisional application No. 62/201,603, filed on Aug. 6, 2015, provisional application No. 62/105,962, filed on Jan. 21, 2015, provisional application No. 62/065,488, filed on Oct. 17, 2014, provisional application No. 62/048,548, filed on Sep. 10, 2014.

(51) Int. Cl.
| | | |
|---|---|---|
| *B01F 3/04* | (2006.01) | |
| *C12H 1/14* | (2006.01) | |
| *C12G 1/00* | (2019.01) | |
| *B01F 15/04* | (2006.01) | |
| *B67D 3/04* | (2006.01) | |

(52) U.S. Cl.
CPC ........ *B01F 5/0428* (2013.01); *B01F 15/0429* (2013.01); *C12G 1/00* (2013.01); *C12H 1/14* (2013.01); *B01F 2215/0072* (2013.01); *B67D 3/043* (2013.01)

(58) Field of Classification Search
CPC ................ B01F 3/04794; B01F 5/0428; B01F 2215/0072; C12G 1/00; C12H 1/14
See application file for complete search history.

(56) References Cited

U.S. PATENT DOCUMENTS

| | | | | |
|---|---|---|---|---|
| 4,892,118 A * | 1/1990 | Davis | ................... | F01D 17/145 |
| | | | | 137/625.3 |
| 5,150,736 A * | 9/1992 | Vincent de Paul | ... | F01D 17/145 |
| | | | | 137/625.3 |
| 5,249,611 A | 10/1993 | Law | | |
| 5,318,270 A * | 6/1994 | Detanne | ................ | F01D 17/145 |
| | | | | 251/120 |
| 5,435,339 A * | 7/1995 | Hayes | .................. | F16K 31/528 |
| | | | | 137/315.04 |
| 6,053,366 A | 4/2000 | Legué | | |
| 6,131,767 A * | 10/2000 | Savage | .................. | B67D 3/043 |
| | | | | 222/1 |
| 6,321,948 B1 * | 11/2001 | Bellon | ................... | B67D 3/045 |
| | | | | 222/153.14 |
| 6,554,019 B1 | 4/2003 | Grittmann | | |
| 6,978,981 B2 * | 12/2005 | Roos | ...................... | B67D 3/045 |
| | | | | 251/265 |
| 7,140,520 B1 | 11/2006 | Rutler | ................... | B67D 3/043 |
| | | | | 222/511 |
| 7,201,188 B2 * | 4/2007 | Baumann | ................. | F16K 1/54 |
| | | | | 137/625.33 |
| 7,665,632 B2 * | 2/2010 | Ziesel | .................. | B67D 1/0051 |
| | | | | 222/129.1 |
| 8,220,775 B2 * | 7/2012 | Bittner | .................... | F16K 3/246 |
| | | | | 251/121 |
| 8,336,743 B2 * | 12/2012 | Bellmore | ............... | B67D 3/043 |
| | | | | 222/509 |
| 8,387,837 B2 | 3/2013 | Bellmore | | |
| 8,522,820 B2 * | 9/2013 | Biwanski | ................ | F16K 47/08 |
| | | | | 137/625.3 |
| 8,870,039 B2 | 10/2014 | Bellmore | | |
| 8,978,546 B2 * | 3/2015 | Chen | .................... | B67D 1/0085 |
| | | | | 261/109 |
| 9,120,065 B2 * | 9/2015 | Santrach | ............. | B01F 3/04794 |
| 10,227,167 B2 * | 3/2019 | Darby | ................... | B65D 77/067 |
| 2006/0162785 A1 * | 7/2006 | Smith | ..................... | F16K 3/246 |
| | | | | 137/384 |
| 2009/0014075 A1 * | 1/2009 | Hansson | ............... | B67D 1/1416 |
| | | | | 137/600 |
| 2010/0091605 A1 * | 4/2010 | Rasmussen | ........... | B01F 3/0446 |
| | | | | 366/107 |
| 2011/0011897 A1 * | 1/2011 | Bellmore | ................ | B67D 3/043 |
| | | | | 222/505 |
| 2012/0199013 A1 * | 8/2012 | Gutierrez | ............ | B01F 3/04503 |
| | | | | 99/323.1 |
| 2012/0199615 A1 * | 8/2012 | O'Keefe, Jr. | .......... | B67D 3/043 |
| | | | | 222/505 |
| 2012/0206993 A1 * | 8/2012 | Casper | ................ | B01F 3/04503 |
| | | | | 366/163.2 |
| 2013/0119084 A1 * | 5/2013 | Morayko | ............. | B65D 47/248 |
| | | | | 222/83 |
| 2013/0270722 A1 * | 10/2013 | Phillips | ............... | B01F 3/04808 |
| | | | | 261/64.3 |
| 2013/0306684 A1 | 11/2013 | Bellmore et al. | | |
| 2014/0091107 A1 * | 4/2014 | Becker | ................... | B65D 25/40 |
| | | | | 222/190 |
| 2015/0096999 A1 * | 4/2015 | Nini | ....................... | B67D 3/043 |
| | | | | 222/81 |
| 2016/0067655 A1 | 3/2016 | Roberts | | |
| 2017/0297886 A1 * | 10/2017 | Van Der Weij | ..... | B01F 3/04787 |

FOREIGN PATENT DOCUMENTS

| | | | | |
|---|---|---|---|---|
| GB | 2333288 A | 7/1999 | | |
| WO | 8304082 A1 | 11/1983 | | |
| WO | WO-8304082 A1 * | 11/1983 | ............. | B67D 3/042 |
| WO | 2013100479 A1 | 7/2013 | | |
| WO | WO-2013100479 A1 * | 7/2013 | ............. | F16K 31/46 |
| WO | WO-2016034237 A1 * | 3/2016 | ........... | B67D 1/0045 |

OTHER PUBLICATIONS

PCT Search Report and Written Opinion from the ISA/US for International Application No. PCT/US2017/053547, dated Dec. 11, 2017.

Search Report issued by the European Patent Office, dated Apr. 23, 2020, for related EP Patent Application No. 17854147.0.

* cited by examiner

TAP AND AERATOR APPARATUS

CROSS-REFERENCE TO RELATED APPLICATIONS

This U.S. Non-Provisional Patent Application is a Continuation-in-Part of U.S. Ser. No. 14/846,206, filed on Sep. 4, 2015, and this application also claims the benefit of U.S. Provisional Patent Application No. 62/399,687, filed on Sep. 26, 2016, titled "TAP AND AERATOR APPARATUS," and U.S. Provisional Patent Application No. 62/400,335, filed on Sep. 27, 2016, titled "TAP AND AERATOR APPARATUS," the contents of which are expressly incorporated herein by this reference as though set forth in their entirety. The parent application (Ser. No. 14/846,206) claims the benefit of U.S. Provisional Patent Application Nos. 62/048,548, filed on Sep. 10, 2014, titled "BOX WINE TAP AERATOR CONTROL", 62/065,488, filed on Oct. 17, 2014, titled "BOX WINE TAP AERATION CONTROL HOLE PLACEMENT", 62/105,962, filed on Jan. 21, 2015, titled "TAP WITH INTEGRATED AERATOR, AERATION REGULATOR, AND CONTAINER LABELING", and 62/201,603, filed on Aug. 6, 2015, titled "LIQUID DISPENSER WITH INTEGRATED AERATION BY CYCLONE AND REGULATION OF AERATION", all by sole inventor Nathaniel Travis Roberts, the contents of which are all expressly incorporated herein by this reference as though set forth in their entirety.

FIELD

The present disclosure relates generally to a tap and aerator apparatus, and more specifically, to a container tap and aerator apparatus with aeration inlets that may be toggled between an open position and a closed position.

BACKGROUND

The Venturi effect is the phenomenon that occurs when a fluid that is flowing through a tube is forced through a constriction, resulting in a pressure decrease and a velocity increase. Specifically, the fluid must speed up in the constriction in order for the total flow rate to remain the same. However, because the amount of fluid that enters the tube at a certain time must be the same as the amount of fluid coming out, the fluid must move faster through the constriction in order for enough fluid to flow in the specified time. Moreover, because the fluid is flowing faster in the constriction, Bernoulli's principle indicates that the pressure in the constriction should be lower than the pressure outside. Specifically, high pressure before the constriction may cause the fluid to accelerate into the low pressure region of the constriction, and high pressure after the constriction may reduce the speed of the fluid as it exits the constriction. Thus, as fluid is forced through the constriction, the increased flow velocity is accompanied by a pressure drop. Many industry applications, such as wine aerators, utilize this pressure drop to draw air into the fluid.

As most wine enthusiasts know, one of the most common ways to improve the taste of wine immediately before consumption is through aeration. Aeration expands the surface area of wine, thereby allowing air to mingle with the wine. This results with the wine having an expanded aromatic profile. Aerating wine may be performed by utilizing the Venturi effect, which helps pull air into the wine.

A prime candidate for aeration is boxed wine due to its inferior quality compared to bottled wine. Boxed wine is essentially a bag of wine in a box, comprising an integrated tap packaged inside or on the side of the box. Importantly, boxed wine has an open shelf life due to the permeability of the bag, tap, and the rate of consumption of the liquid. In particular, the packaging generally allows small amounts of oxygen into the wine, and this air may eventually cause over oxidation and spoilage to the wine. Although aeration typically enhances wine through oxidation, in some circumstances, such as that of already oxidized wine, it may be a disadvantage to aerate the wine, causing it to become over oxidized.

Due to the large volume of wine in a box of wine, the pressure drop at the valve may be very high. Thus, if a Venturi opening is placed immediately at the narrowest point of the valve, such as is shown in U.S. Published Patent Application No. 2012/0199013, filed by Gutierrez, the Venturi effect may be too strong and the amount of air pulled into the wine may cause the wine to be over-oxidized. Moreover, the spout described in the Gutierrez reference may reduce the flow rate dramatically in order to take direct advantage of the Venturi effect. In some cases, the flow rate may drop as much as 50%. Accordingly, it may take a much longer for a user to pour the appropriate amount of fluid.

Thus, what is needed is a tap apparatus that: (1) provides the proper amount of aeration; (2) has a control to toggle the aeration on and off; and (3) does not significantly impact the flow rate of the primary fluid. The aeration control may be a mechanism that controls the amount of air pulled through to aerate the liquid. The tap apparatus may also provide the ability to inform the consumer when not to use the aerator in order to acquire the best flavor of the liquid.

SUMMARY

To minimize the limitations in the cited references, and to minimize other limitations that will become apparent upon reading and understanding the present specification, the present specification discloses a new and improved tap and aerator apparatus. The tap apparatus may be a container tap and aerator apparatus, wherein the aeration inlets may be toggled between an open position and a closed position.

One embodiment may be a tap and aerator apparatus comprising: a container coupling portion; a chamber; one or more aerator portions; a regulator cap; a spout; a valve; and a control member. The container coupling portion may be configured to be coupled with a container. The container contains a liquid, which may preferably be wine. The control member may be configured to allow the liquid to pass from the container, through the valve, into the chamber, and out of the spout. The regulator cap may be configured to be removed from the tap and aerator apparatus. When the regulator cap may be removed from the tap and aerator apparatus the one or more aerator portions may be placed in an open position. When the regulator cap is on the apparatus the aerator portions are closed. The aerator portions may be substantially disposed with the chamber and distal to the valve. When the aerator portions may be opened and when the liquid passes through the chamber, the liquid passing out the spout may be aerated by air passing through the one or more aerator portions. The control member may comprise a plunger and an O-ring, wherein the plunger and O-ring may be configured to form a releasable seal with the valve, such that when the control member may be articulated the liquid may be allowed to pass through the valve. The regulator cap may be removeably connected to the tap and aerator apparatus. Alternatively, the regulator cap may be displaceable from the tap and aerator apparatus. The control member may control the flow of the liquid from the container and through the valve. When the regulator cap is not removed the liquid passing through the chamber is not aerated. The tap and aerator apparatus allows a user to aerate and access the liquid with one hand. The air may be drawn through the aerator portions by a vortex force created by the liquid passing through the chamber. The container may include instructions to a user regarding when to remove the regulator cap when pouring the liquid.

Another embodiment may be a tap and aerator apparatus comprising: a container coupling portion; a chamber; one or more aerator portions; a regulator cap; a spout; a valve; a control member. The container coupling portion may be configured to be coupled with a liquid container. The control member may comprise a plunger and an O-ring. The plunger and O-ring may be configured to form a releasable seal with the valve, such that when the control member is articulated the liquid may be allowed to pass from the container, through the valve, into the chamber, and out of the spout. The control member may control the flow of the liquid from the container and through the valve. The regulator cap may be configured to be removed from the tap and aerator apparatus. When the regulator cap is removed from the tap and aerator apparatus the one or more aerator portions may be placed in an open position. The one or more aerator portions may be substantially disposed with the chamber and distal to the valve. When the one or more aerator portions are opened and when the liquid passes through the chamber, the liquid passing out the spout may be aerated by air passing through the one or more aerator portions. The air may be drawn through the aerator portions by a vortex force created by the liquid passing through the chamber. When the regulator cap is not removed the liquid passing through the chamber is not aerated. The tap and aerator apparatus allows a user to aerate and access the liquid with one hand. The regulator cap may be removeably connected to the tap and aerator apparatus via a hinge. The regulator cap may be displaceable from the tap and aerator apparatus. The container includes instructions to a user regarding when to remove the regulator cap when pouring the liquid. The container comprises a box of wine.

It is an object to provide an aerator tap with aerator inlets that may be located at the valve or in the spout.

It is an object to provide an aerator tap with aerator inlets that may be closed or open.

An additional objective is to provide an aerator tap that may be manipulated with a single hand of a user while allowing the aerator inlets to be opened, closed, or in a toggled position. Additionally, the tap apparatus may provide the manufacturer with the ability to inform the consumer when not to use the aerator for obtaining the best flavor of the liquid.

It is an object to overcome the limitations of the prior art.

Other features and advantages will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE DRAWINGS

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive.

Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

Figure 1:
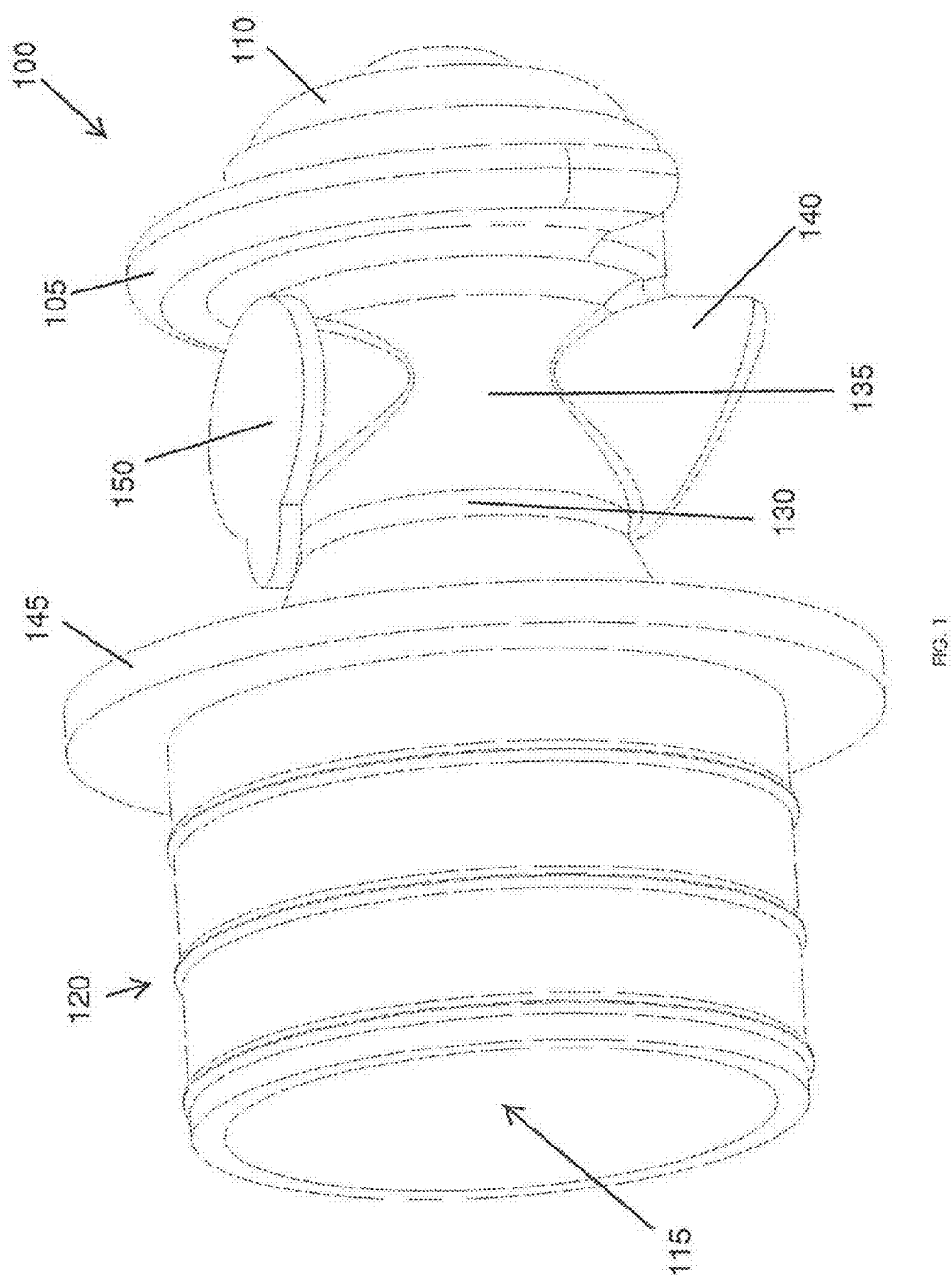
FIG. 1 is an illustration of a perspective view of one embodiment of a tap and aerator apparatus.

FIG. 1 is an illustration of a perspective view of one embodiment of a tap and aerator apparatus. The tap and aerator apparatus 100 may be coupled with a container in order to assist in the aeration and dispensing of a liquid. The tap and aerator apparatus 100 may be manufactured from any material including, but not limited to, plastic, polymer, resin, thixo, and/or liquid silicone rubber. In one embodiment, the tap and aerator apparatus 100 may be used to serve wine. Thus, the materials of the tap and aerator apparatus 100 may be food grade material. It should be noted that the other embodiments described herein can also be made of the same materials described with regard to this embodiment. As shown in FIG. 1, the apparatus 100 may comprise a finger grip 105, a control member 110, entry opening (or liquid inlet portion) 115, container coupling portion 120, valve 130, chamber 135 (shown in FIG. 4), spout (or liquid outlet portion) 140, coupler ring 145, and a regulator cap 150.

In one embodiment, the tap and aerator apparatus 100 may be configured to couple to a fluid container. Once the tap and aerator apparatus 100 is coupled to the container, a user may initiate with a single hand the flow of liquid from the container and through the tap and aerator apparatus 100 by holding the finger grip 105 and pressing the control member 110. The control member 110 may be designed to dispense liquid from the container such that when a user presses the control member 110, a piston, plunger, rod, and/or other valve actuation mechanism, may be activated, which in turn may release a seal, valve, or closure member. The control member 110 may be constructed as a unitary piece or several parts, as shown herein. Prior to releasing a valve sealing closure member, liquid may be entirely contained within the container and the container coupling portion 120. In one embodiment, the container coupling portion 120 may be substantially housed within the container such that the coupler ring 145 may be substantially flush against the container. In another embodiment, the container coupling portion 120 may removeably connect to a fastener or neck of a container. Once the user releases the valve sealing closure member, the liquid may flow from the container through the tap and aerator apparatus 100, such that liquid travels through the opening 115 of the container coupling portion 120, through the valve 130, into the chamber 135, and out the spout 140. In one embodiment, the spout 140 may be designed to direct the flow of liquid in a downward direction.

The valve 130 may be designed as a narrow section, such that, as liquid passes through, a resulting pressure may decrease and the velocity may increase. Additionally, as shown in FIG. 1, the regulator cap 150, which may cover or house the aerator portions, may be positioned above or directly away from the spout 140. This may allow the aerator portions to provide aeration to the liquid passing through the chamber 135 when the regulator cap is open. Otherwise, the user may prevent aeration by simply closing or sealing the regulator cap 150. The regulator cap 150 may be entirely removable, removeably connected, and/or displaceable from the tap and aerator apparatus 100. One embodiment, of the regulator cap 150 may be entirely removable, such that the user may remove the regulator cap 150 and set it aside to leave the tap and aerator apparatus 100 in an open position. In this embodiment, however the regulator cap 150 should not be configured to reconnect to the tap and aerator apparatus 100 as in its former position. Another embodiment may be a regulator cap 150 that is removeably connectable, such that the user may remove the cap 150 from the tap and aerator apparatus 100 to open the aerator portions. However, unlike the previous embodiment, the regulator cap 150 may be reconnected to the apparatus 100 to close the aerator portions.

A third embodiment of the regulator cap 150 may be displaceable. In this embodiment, the regulator cap 150 may be partially or completely removed from the tap and aerator apparatus 100 such that the aerator portions are open, but the cap 150 remains attached to the tap and aerator apparatus 100. The cap 150 may remain attached through one or more hinges or slide sides, such that the cap hinges out or pops upward. When the user wants to close the aerator portions, the user flips or pushes the cap 150 downward and reconnects it to the tap and aerator apparatus 100, such that the aerator portions are closed. Alternatively, rather than a hinge, the regulator cap 150 may be tethered to the tap and aerator apparatus 100.

In one embodiment, after the regulator cap 150 has been removed, the aerator portions may be exposed. This may allow the user to close or seal the holes using his or her fingers or other objects. Although FIG. 1 shows that the regulator cap 150 is a form fitting cap, various embodiments of the regulator cap 150 may include, without limitation, a plug, an adhesive strip, a sleeve, a cup, a tab, and/or an insert. The regulator cap 150 may be held firmly or loosely in place via friction, an adhesive, a snap, or one or more removable devices.

Figure 8:
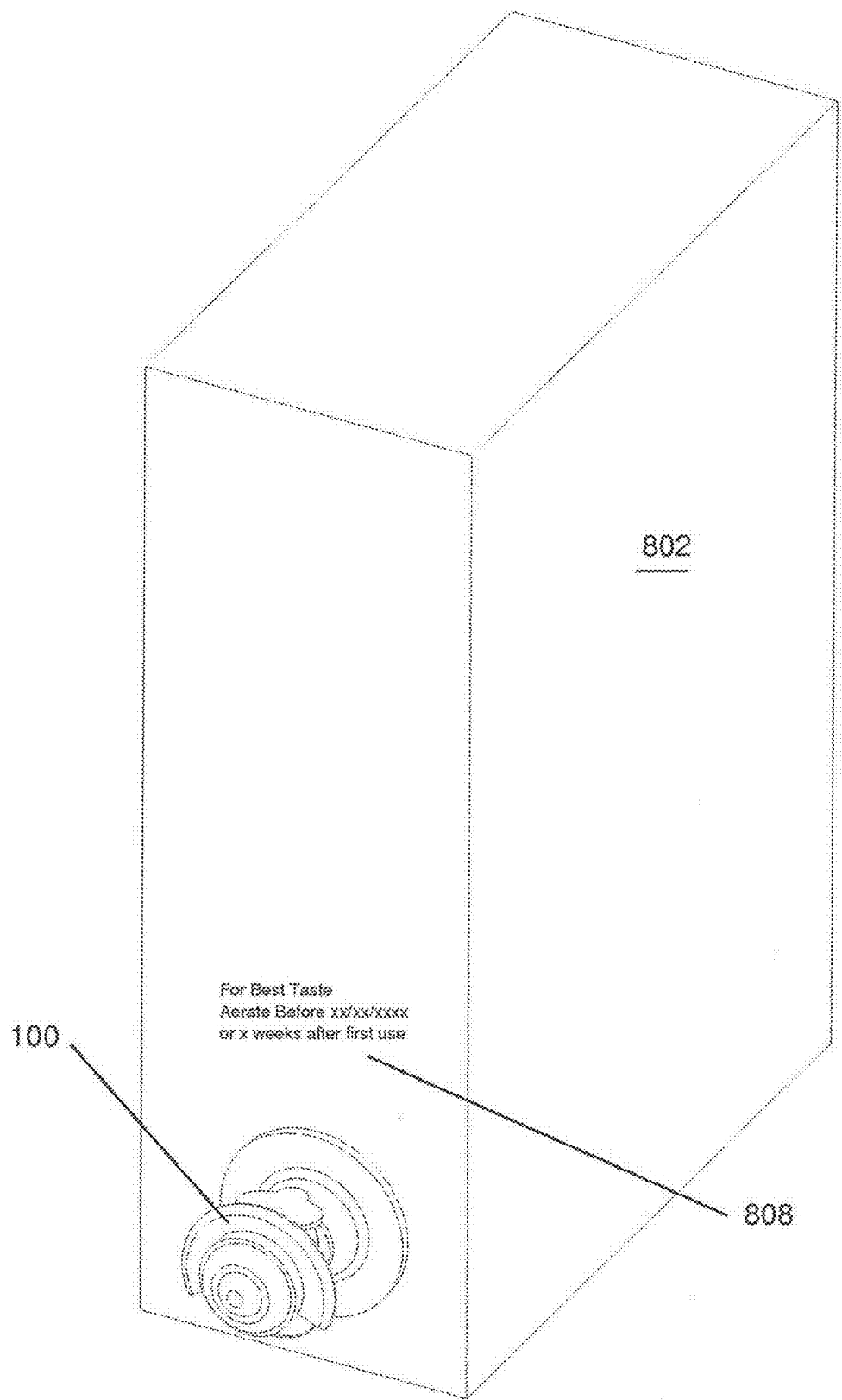
FIG. 8 is an illustration of one embodiment of a tap and aerator apparatus coupled to a container.

In a preferred embodiment (as shown in FIG. 8), the tap and aerator apparatus 100 may be installed or coupled to a wine box. In this embodiment, the tap and aerator apparatus 100 may release the wine from the wine box in a normal or aerated state. The aeration of the wine will preferably allow the wine to interact with the atmosphere in order to oxidize certain chemicals, such as tannins, naturally contained in the wine, which would otherwise impair the taste of the wine.

Figure 2:
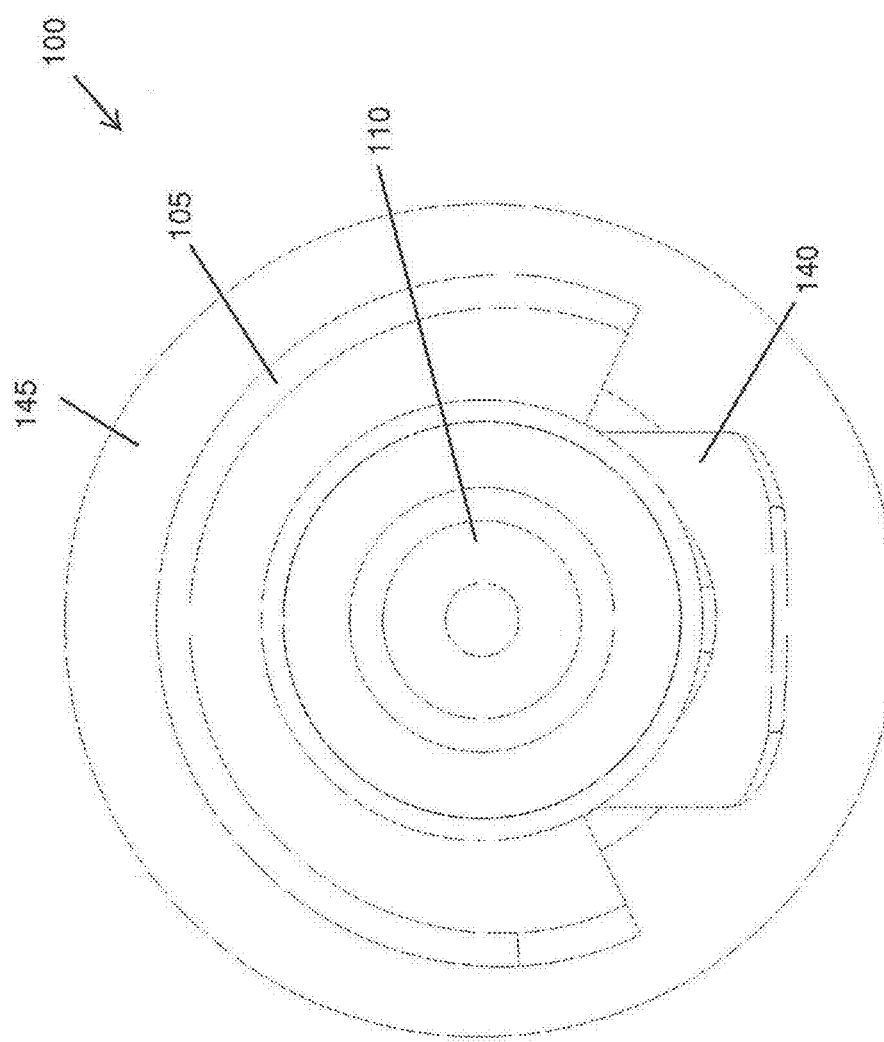
FIG. 2 is an illustration of a front view of one embodiment of a tap and aerator apparatus.

FIG. 2 is an illustration of a front view of one embodiment of a tap and aerator apparatus. FIG. 2 shows that the tap and aerator apparatus may comprise a finger grip 105, control member 110, spout 140, and coupler ring 145. A user may dispense liquid from a container by holding the finger grip 105 and pressing the control member 110 in order to initiate the flow of liquid from the container, through the tap and aerator apparatus 100, and out of the spout 140. In one embodiment, the control member 110, as shown, may be a pressure or spring loaded button that, when depressed, allows liquid to flow into the chamber 135. When released and no longer depressed by the user, the control member 110 may return to its original state. The control member 110 may be any type of mechanism for controlling the flow of a liquid, including, but not limited to, a push button, ball valve lever, pump, a twist valve handle, a lever, a plunger, a pull knob, slide lever, latch, switch, digital switch, and/or a twist knob.

Figure 3:
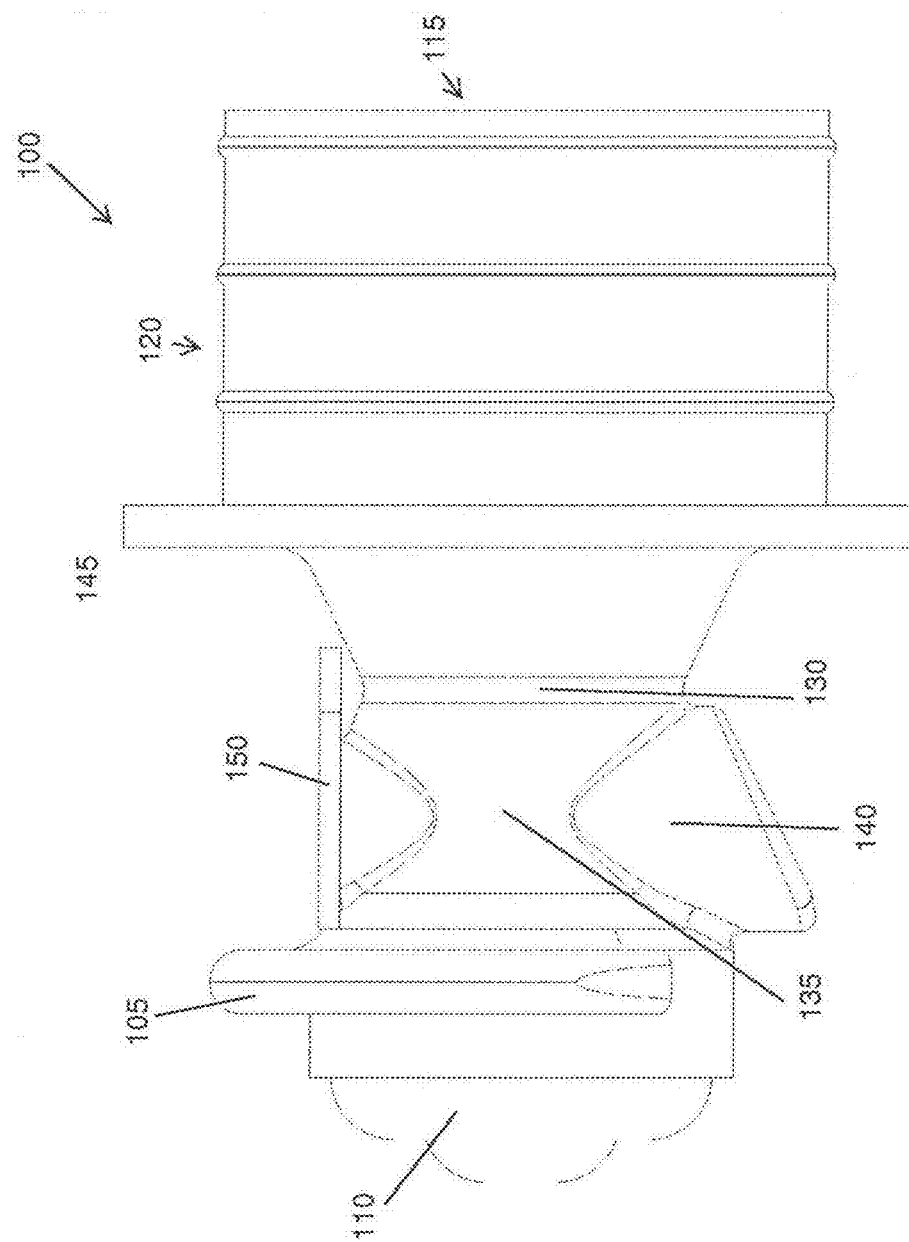
FIG. 3 is an illustration of a side view of one embodiment of the tap and aerator apparatus.

FIG. 3 is an illustration of a side view of one embodiment of the tap and aerator apparatus. As shown in FIG. 3, one embodiment of the tap and aerator apparatus 100 may comprise a finger grip 105, a control member 110, entry opening 115, container coupling portion 120, valve 130, chamber 135, spout 140, coupler ring 145, and a regulator cap 150.

Figure 4:
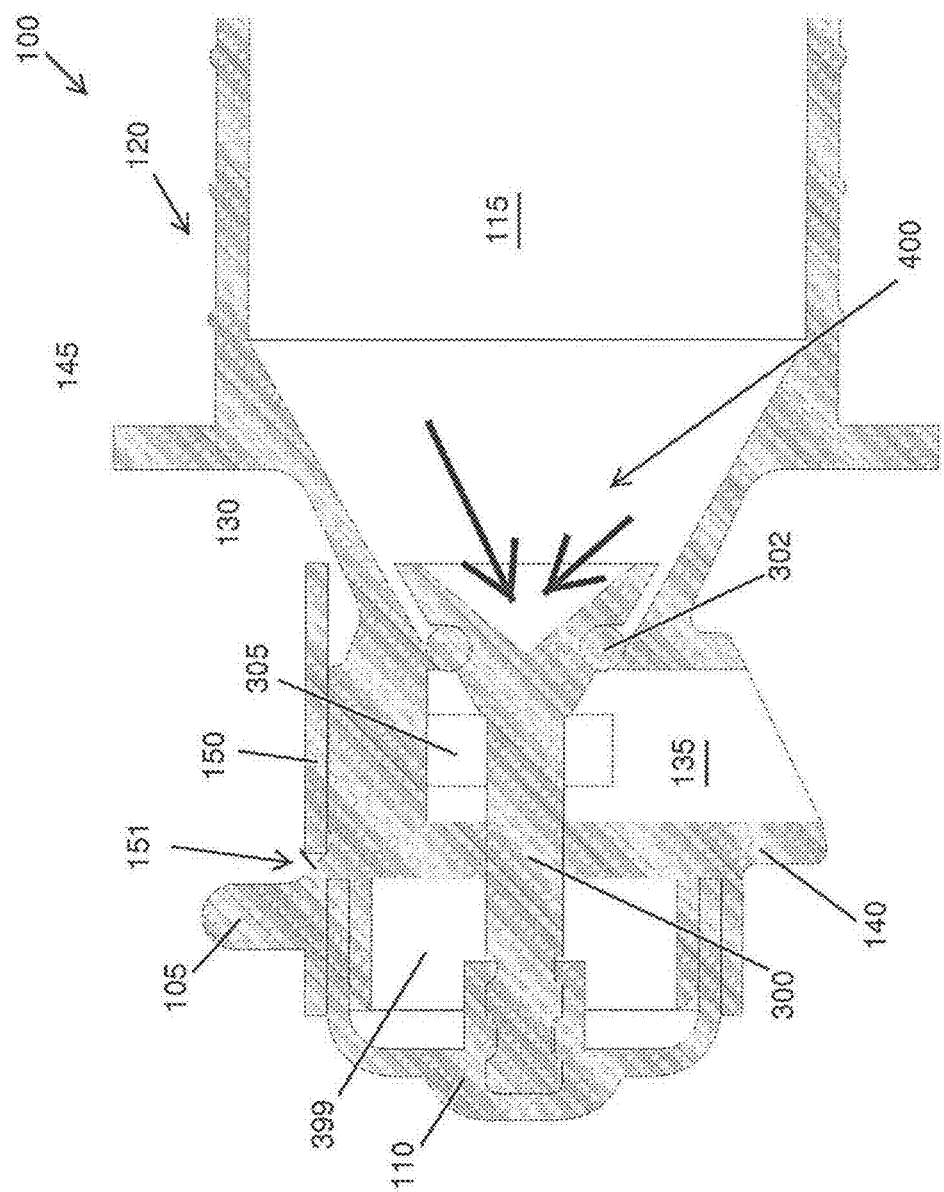
FIG. 4 is an illustration of a cross-section side view of one embodiment of a tap and aerator apparatus.

FIG. 4 is an illustration of a cross-section side view of one embodiment of a tap and aerator apparatus. As shown in FIG. 4, one embodiment of the tap and aerator apparatus 100 may comprise: a finger grip 105, a control member 110, entry opening 115, container coupling portion 120, valve 130, chamber 135, spout 140, coupler ring 145, a regulator cap 150, hinge 151, plunger (or plug valve) 300, O-ring 302, and aerator portions 305. FIG. 4 shows how the control member 110 may be a button that, when pushed or depressed, forces the plunger 300 inwards such that the fluid pressure 400 is overcome and fluid passes from the entry opening 115, through the valve 130 and into chamber 135. The fluid may then flow out of spout 140. When regulator cap 150 is removed, the fluid in the chamber 135 may create a vortex, cyclone, or suction force that pulls air through the aerator portions 305, which, as shown, may be hollow tubes. In this manner, the liquid being poured is aerated and only aerated if the user chooses to aerate.

When the user stops articulating the control member 110, the fluid pressure 400 causes the plunger 300 to engage with the O-ring 302 to form a seal with the valve 130, thereby obstructing or stopping the flow of liquid out of the container. In an alternative embodiment, the plunger 300 and control member 110, which may be a unitary part or constructed of several different but coupled parts, may be forced towards a closed/outward position via a spring or other mechanical device. This spring may be positioned within the cavity 399 such that the spring forces the plunger 300 and control member 110 outwards. O-ring 302 may be a rubber O-ring, or may be a seal, gasket, or any device that forms a liquid tight and/or air tight seal at or near the valve 130.

In an alternative embodiment, spout 140 may be further constricted or screened at its opening to partially constrict the flow of liquid out of the chamber 135. This alternative embodiment contrasts with preferred embodiment wherein the liquid flow rate from the container is unchanged or only minimally changed with the engagement of the aerator portions 306. Preferably, the chamber 135 and spout 140 are not constricting and do not cause the flow rate to drop when the aerator portions 306 are opened. This preferred embodiment has an open and uninhibited entrance of air that compensates for both flows.

Figure 5:
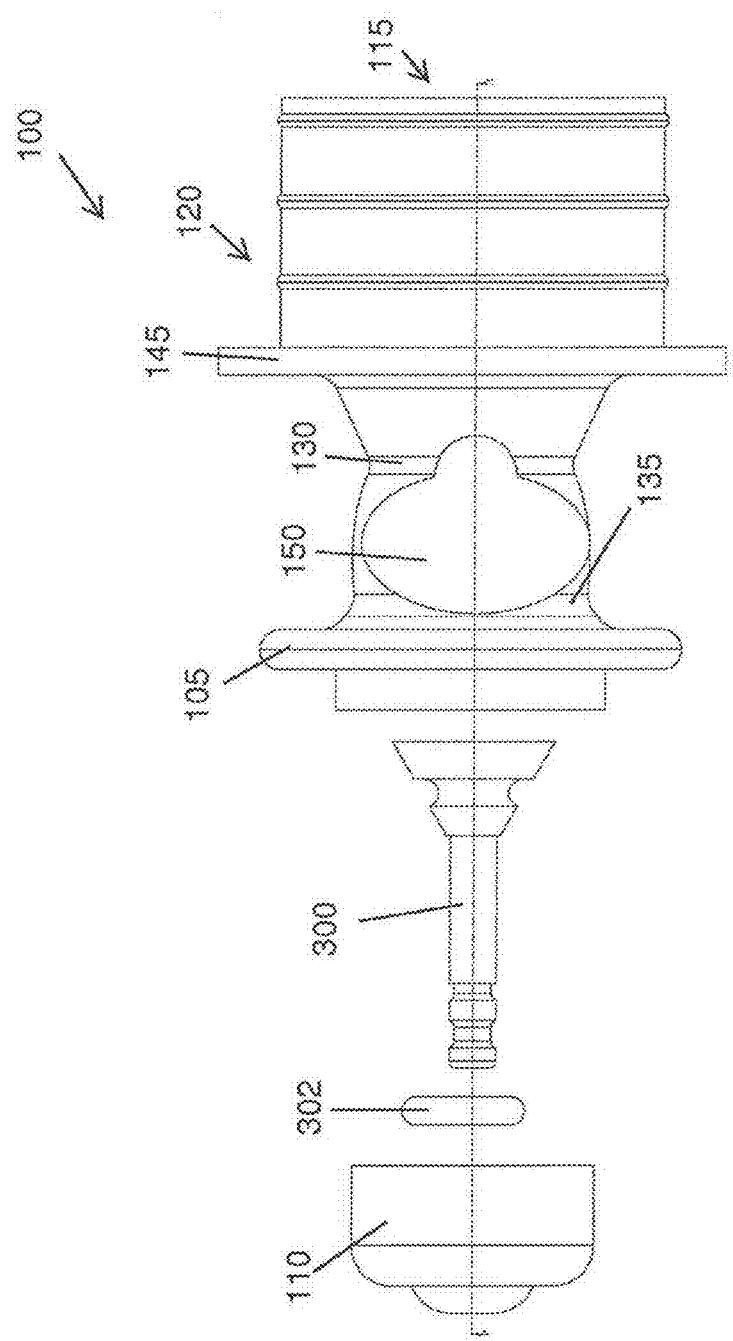
FIG. 5 is an illustration of a top exploded view of one embodiment of a tap and aerator apparatus.
Figure 6:
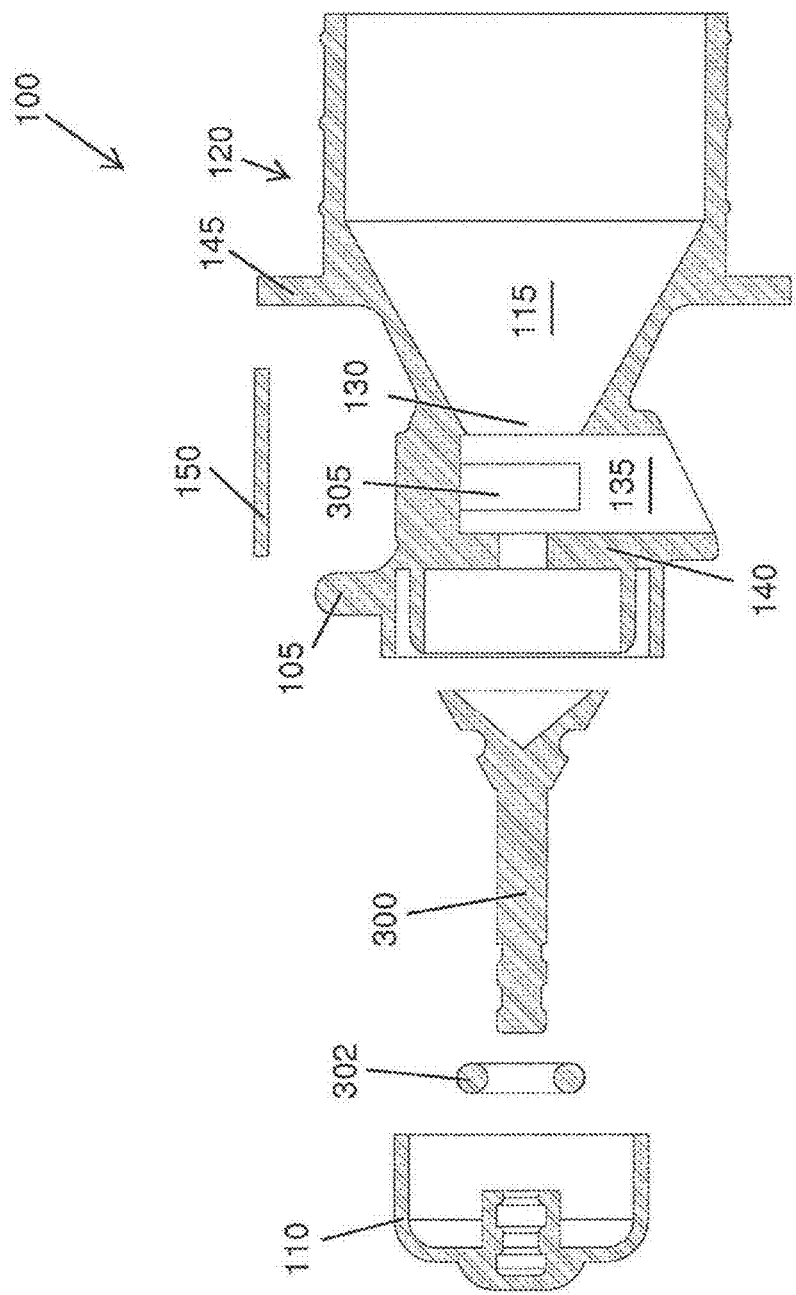
FIG. 6 is an illustration of a cross-section exploded side view of one embodiment of a tap and aerator apparatus.

FIG. 5 is an illustration of a top exploded view of one embodiment of a tap and aerator apparatus. As shown in FIG. 4, the apparatus 100 may comprise: a finger grip 105, a control member 110, entry opening 115, container coupling portion 120, valve 130, chamber 135, coupler ring 145, a regulator cap 150, plunger 300, and O-ring 302. FIG. 6 is an illustration of a cross-section exploded side view of one embodiment of a tap and aerator apparatus. As shown in FIG. 4, one embodiment of the tap and aerator apparatus 100 may comprise: a finger grip 105, a control member 110, entry opening 115, container coupling portion 120, valve 130, chamber 135, spout 140, coupler ring 145, a regulator cap 150, plunger 300, O-ring 302, and aerator portions 305. FIGS. 5 and 6 also show how the parts of the tap and aerator apparatus 100 may engage and fit together.

Figure 7:
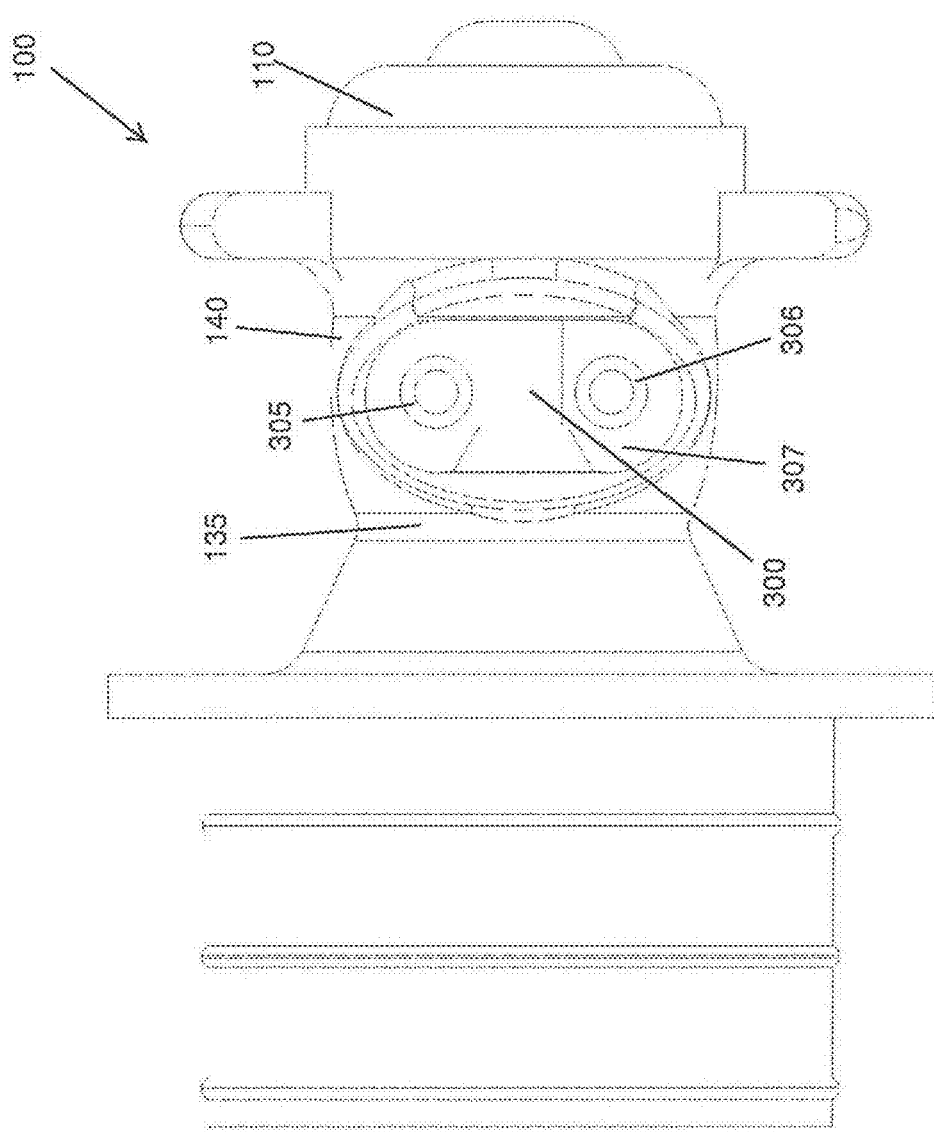
FIG. 7 is an illustration of a bottom view of one embodiment of a tap and aerator apparatus.

FIG. 7 is an illustration of a bottom view of one embodiment of a tap and aerator apparatus. As shown in FIG. 7, one embodiment of the tap and aerator apparatus 100 may comprise: a chamber 135, spout 140, plunger 300, aerator portions 305, 306, and chamber backing 307. FIG. 7 shows how the control member 110 may be a button that, when pushed or depressed, forces the plunger 300 inward such that the fluid pressure 400 is overcome and the fluid may pass from the entry opening 115, through the valve 130 and into chamber 135. The fluid may then flow out of spout 140. When regulator cap 150 is removed, the fluid in the chamber 135 may create a vortex or suction force that pulls air through the aerator portions 305, 306, which, as shown, may be hollow tubes. Chamber backing 307 may define a top portion of the chamber 135. Although aerator portions 305, 306 are shown substantially perpendicular to valve 130, the aerator portions 305, 306 may be disposed at any angle to enable aeration. Moreover, in some embodiments the aerator portions 305 may be shorter or longer depending upon how much aeration is desired.

In one embodiment the aerator portions 305 may be positioned on or near the valve 130. In this embodiment maximum aeration is desired.

FIG. 8 is an illustration of one embodiment of a tap and aerator apparatus coupled to a container. FIG. 8 shows that the container 802 may be a bag in the box that is configured to hold a fluid, such wine. The bag may be designed to be somewhat air permeable, such that oxygen gas may enter the bag to oxidize the wine. FIG. 8 shows how the tap and aeration apparatus 100 may be coupled to the container 802. Additionally, instructions 808 may be provided to the user to inform him or her the time period of wine consumption. Specification, the instructions 808 may inform the user that the wine is best aerated before a certain date or before/after a certain duration has passed since first accessing the wine. In this manner, the user may be prevented from over oxidizing the wine. FIG. 8 also shows that a user may use a single hand to hold the finger grip 105 and press the control member 110 to initiate the flow of wine from the bag, through the valve 130, into chamber 135, and then out the spout 140.

Figure 9:
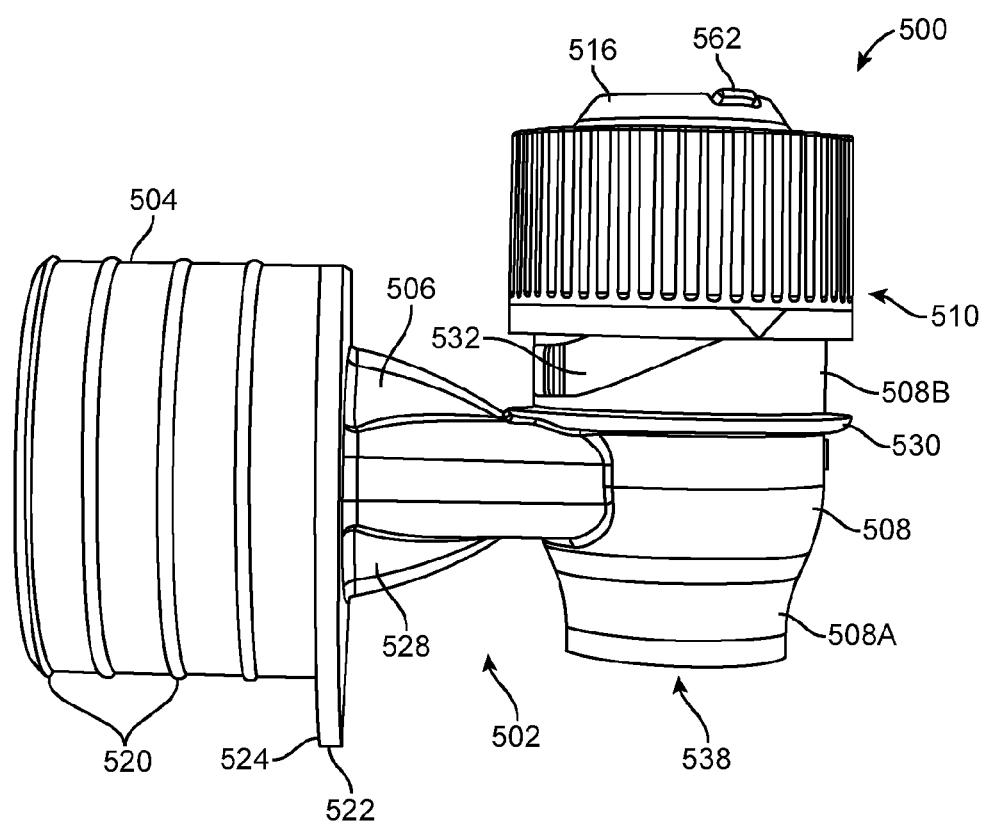
FIG. 9 is a side view of another embodiment of a tap and aerator apparatus.
Figure 10:
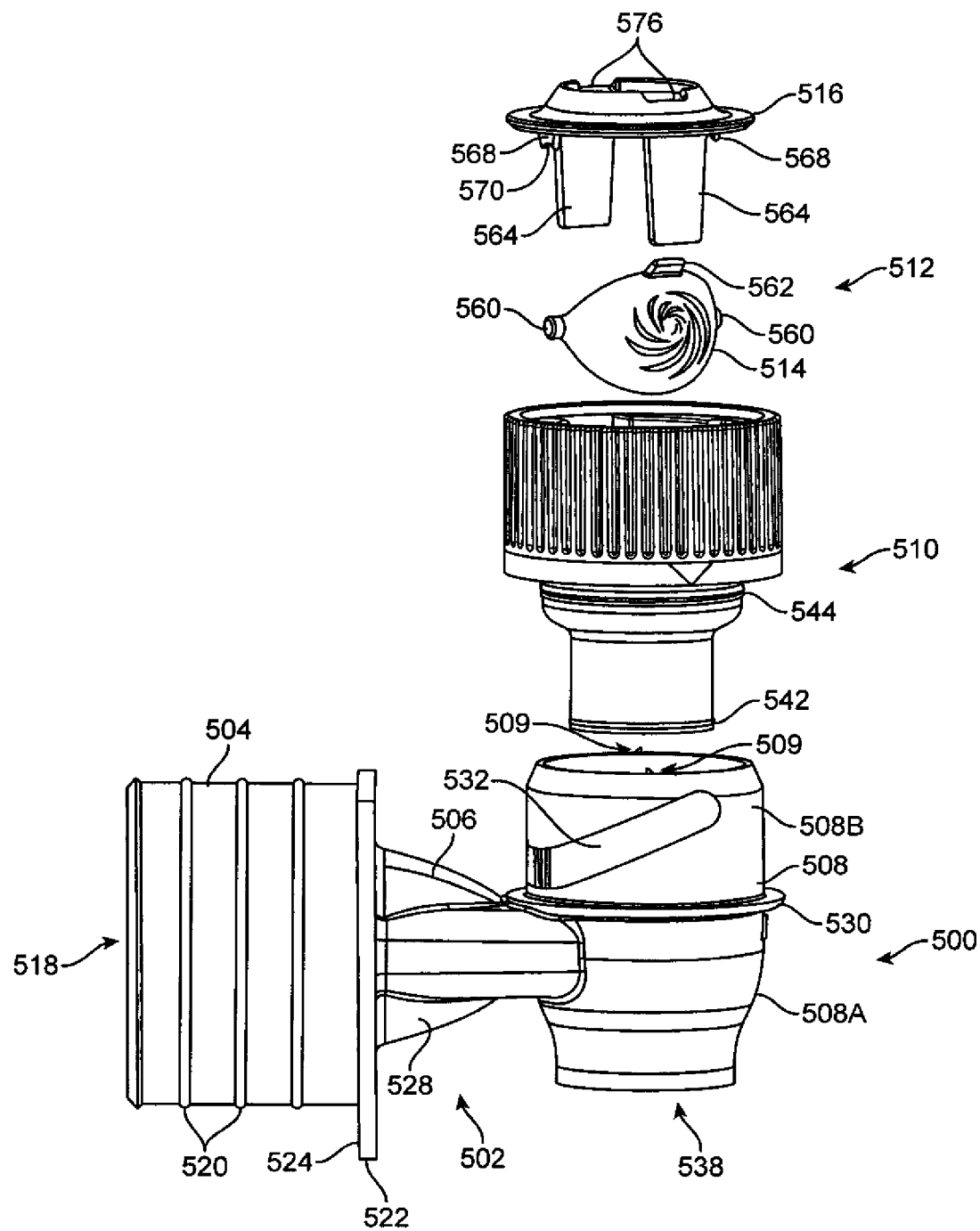
FIG. 10 is an exploded side view of the tap and aerator apparatus of FIG. 9.

Turning now to FIGS. 9-23, another embodiment of the present tap and aerator apparatus is shown and will be described. FIG. 9 is a side view of this embodiment of a tap and aerator apparatus, which is designated as apparatus 500, and FIG. 10 is an exploded view of the components of apparatus 500. The apparatus 500 includes a main component 502 that consists of the following portions: a container coupling portion 504 (which functions similar to the container coupling portions of the other embodiments, such as container coupling portion 120), a body portion 508, and a bridging portion 506 for communicating fluid between the container coupling portion 504 and the body portion 508.

The apparatus 500 also includes: a plug valve portion 501 that is configured and arranged to be seated within the body portion 508 of the main component 402; and an aerator 512 for selectively regulating the airflow into the body portion 508. The aerator 512 of this embodiment includes an obturator (or cap) 514 and a crown member 516.

Figure 11:
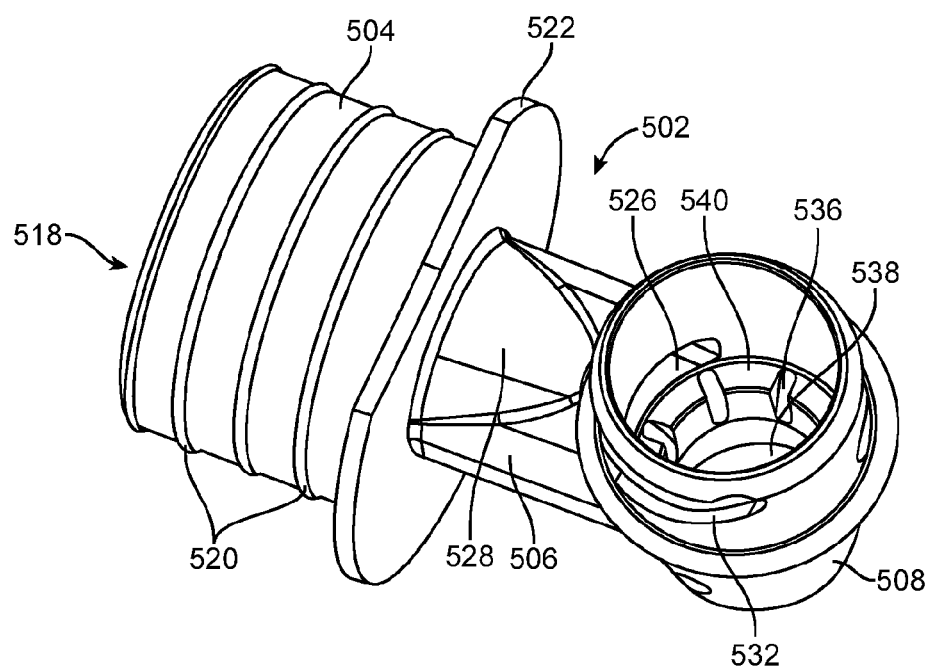
FIG. 11 is a top perspective view of the main component of the tap and aerator apparatus of FIG. 9.
Figure 12:
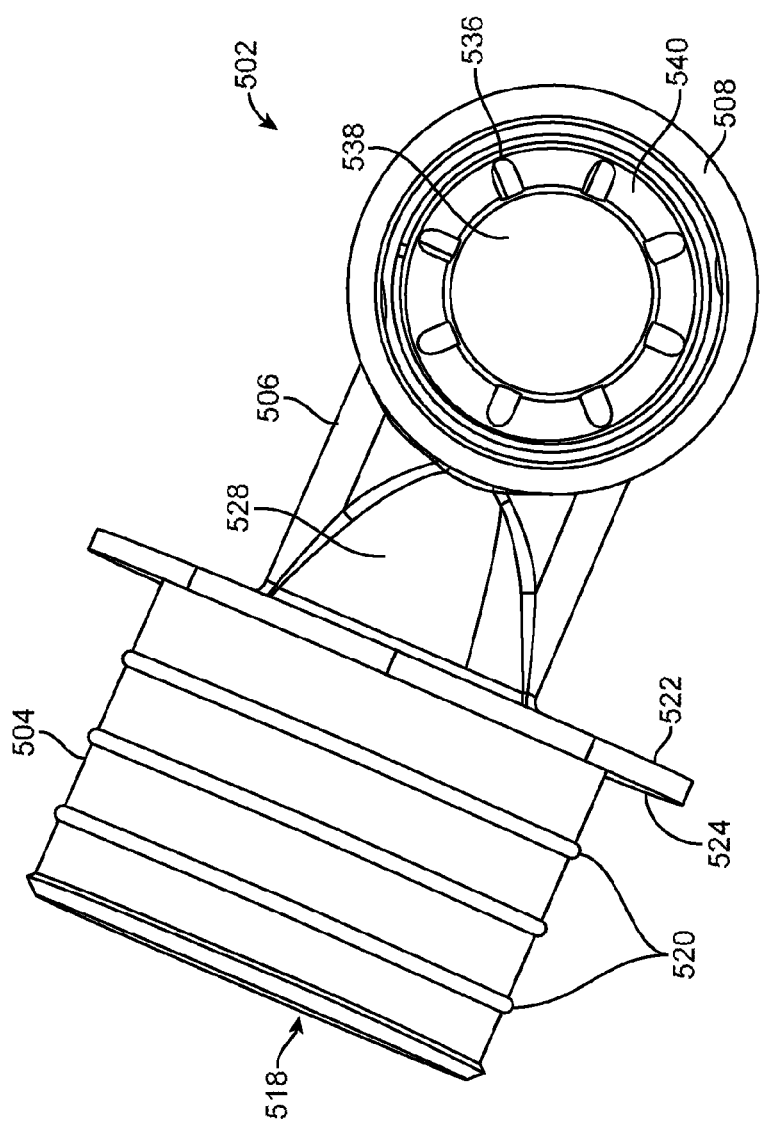
FIG. 12 is a top view of the main component of the tap and aerator apparatus of FIG. 9.

Turning now to FIGS. 10-12, the configuration of this embodiment of the main component 502 will be described. The container coupling portion 504 of the main component 502 is preferably of a generally cylindrical configuration that defines a hollow liquid inlet portion 518 for receiving liquid from the container that the container coupling portion 504 is coupled with in a similar manner to that described with regard to the other embodiments. As in the other embodiments, the container coupling portion 504 of this embodiment may include one or more circumferential ribs 520 to help maintain the apparatus in position when inserted into the container and an enlarged ring 522 that has a rear face 524 that will be seated flush against the container wall to facilitate proper positioning with respect to the container.

The hollow liquid inlet portion 518, which is preferably generally cylindrical in this embodiment, is in fluid communication with a hollow interior portion 526 (FIG. 11) of the bridging portion 506, which may also optionally include an enlarged portion 528 that tapers towards the body portion 508 to create the desired fluid pressure within this passageway. In this embodiment, the hollow interior portion 526 (FIG. 11) of the bridging portion 506 is of a generally oval cross-section and is of a reduced cross-sectional area when compared with the cross-sectional area of the portion of the passageway at the intersection of the container coupling portion 504 and the bridging portion 506.

Figure 15:
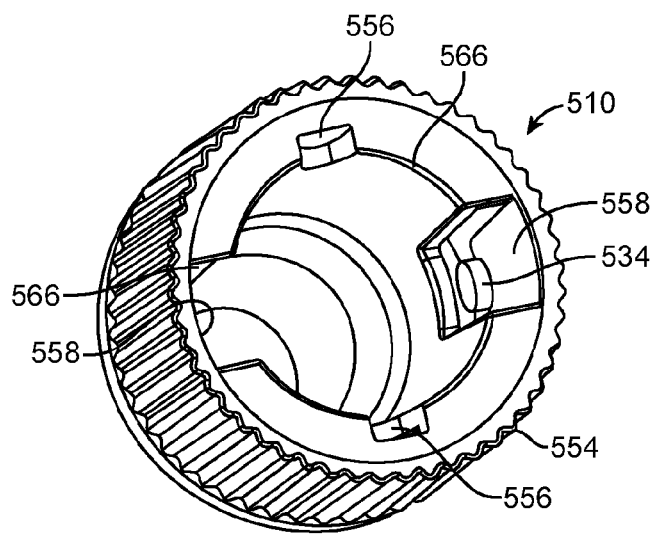

As can be seen in FIGS. 9 and 10, the body portion 508 can be considered as being divided into a lower body portion 508A and an upper body portion 508B, separated by an annular shoulder 530. The outer peripheral surface of the upper body portion 508B preferably includes a pair of inclined grooves 532 (with only one groove 532 being visible in FIGS. 9 and 10) that are configured and arranged to cooperate with a pair of inwardly projecting tabs 534 on the plug valve portion 510, as can be seen in FIG. 15 (in which only one tab 534 is visible) to enable the plug valve portion 510 to be rotated with respect to the body portion 508 between an open position and a closed position, as described below.

FIGS. 11 and 12 show that the interior surface of the body portion 508 includes a plurality of flow channels 536. The flow channels 536 are each preferably formed as a groove within an annular interior flange 540 that is situated in the interior of the lower body portion 508A, where the base of each groove is inclined radially inwardly, thereby directing the fluid passing through each groove both downwardly and radially inwardly. In this embodiment, there are eight flow channels 536 provided, and they are equally spaced from each other around the inner circumference of the lower body portion 508A. However, it is contemplated that a different number of flow channels could be provided (that is more or less than eight), and/or that the flow channels could be spaced apart unevenly (such as having no flow channels near portion 526 and only having the flow channels on the far side of portion 526, or having a few flow channels near portion 526 and a greater number of flow channels formed on the far side of portion 526). A described more fully below, the flow channels 536 direct the fluid downwardly through a liquid outlet portion 538.

Figure 13:
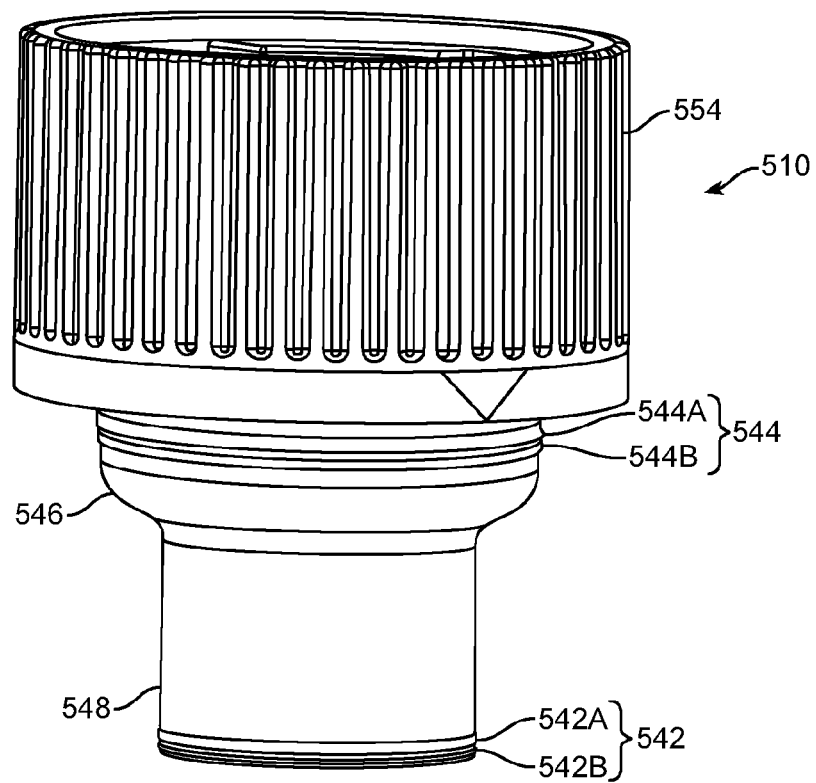
FIG. 13 is a side view of the plug valve portion of the tap and aerator apparatus of FIG. 9.

Turning now to FIGS. 9, 10 and 13-15, the plug valve portion 510 of this embodiment will be described. As can be seen in FIGS. 9 and 10, the plug valve portion 510 is configured and arranged to be seated within the body portion 508. The side view of FIG. 13 shows how the plug valve portion 510 includes a pair of lower sealing beads 542 (designated as 542A and 542B) and a pair of upper sealing beads 544 (designated as 544A and 544B). Each of the sealing beads (542A, 542B, 544A, and 544B) preferably consists of an annular projection that extends radially outwardly from the radial outer surface of the plug valve portion 510. As can be seen in FIG. 13, the upper sealing beads 544A/544B are formed on an upper cylindrical portion 546 of the plug valve portion 510, and the lower sealing beads 542A/542B are formed on the lower cylindrical portion 548 of the plug valve portion 510, where the upper cylindrical portion 546 is of a larger outer diameter than the outer diameter of the lower cylindrical portion 548. Although the lower sealing beads 542 and the upper sealing beads 544 are each shown in this embodiment as a pair of beads, it is contemplated that a single bead could be used for the upper sealing bead, and that a single bead could be used for the lower sealing bead; that more than two beads could be used for the lower sealing beads and more than two beads could be used for the upper sealing beads; and that a different number of beads could be used for the upper bead as compared with the lower bead, such as using a single bead for the upper bead and using two or more beads for the lower bead, or vice versa.

The upper sealing beads 544A/544B are configured and arranged to make sealing contact with an interior peripheral portion 550 (FIG. 20) of the body portion 508 at an area above hollow interior portion 526, and the lower sealing beads 542A/542B are configured and arranged to make sealing contact with an interior peripheral portion 552 (FIG. 20) of the body portion 508 at an area below the lower termination points of the flow channels 536. It should be noted that the lower sealing beads 542A/542B only make sealing contact with interior peripheral portion 552 when the plug valve portion 510 is lowered into the closed position, as described below, but that the upper sealing beads 544A/544B are in sealing contact with portion 550 regardless of whether the plug valve portion 510 is in the closed position (i.e., the lowered position) or in the open position (i.e., the raised position), as also described below. As described more fully below, the plug valve portion 510 may be rotated by the user between the open and closed positions, and in order to facilitate such rotation, a plurality of ridges 554 (or other type of textured surface) may be provided on the upper portion of the plug valve portion 510. Also, in certain embodiments, a click locking feature may be provided to enable the user to be certain that the plug valve portion 510 is locked into the fully closed position. FIG. 10 shows two inclined ridges 509 on the upper cylindrical edge of the body portion 508, where inclined ridges 509 are configured and arranged to make contact and "click" with a pair of corresponding downward facing ridges 511 (FIG. 22, where only one ridge 511 is shown) when the plug valve portion 510 is rotated into the closed position with respect to the body portion 508.

Figure 14:
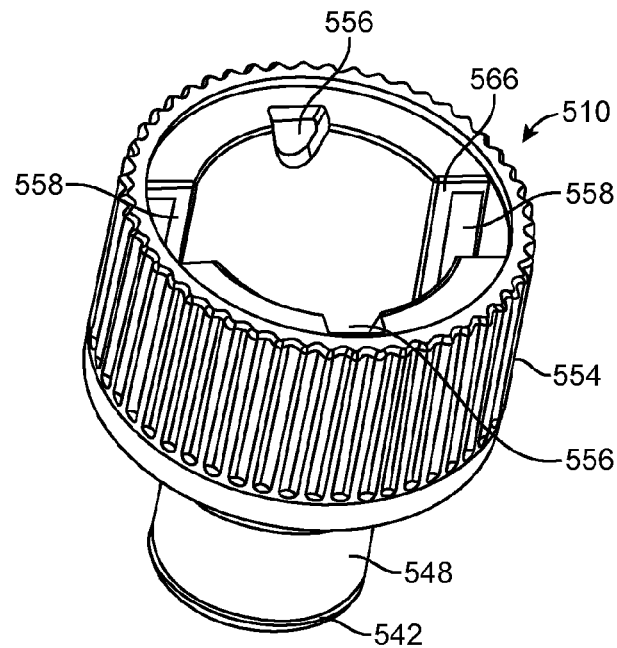
FIGS. 14 and 15 are two top perspective views of the plug valve portion of the tap and aerator apparatus of FIG. 9.

FIGS. 14 and 15 show that the plug valve portion 510 also includes a pair of lower bearing surfaces 556 that are configured and arranged to receive the axle portions of the obturator 514 (FIGS. 10, 16 and 17), as described below, and a pair of cutout portions 558 that are configured and arranged to receive the legs of the crown member 516 (FIGS. 10, 18 and 19) as also described below.

Figure 16:
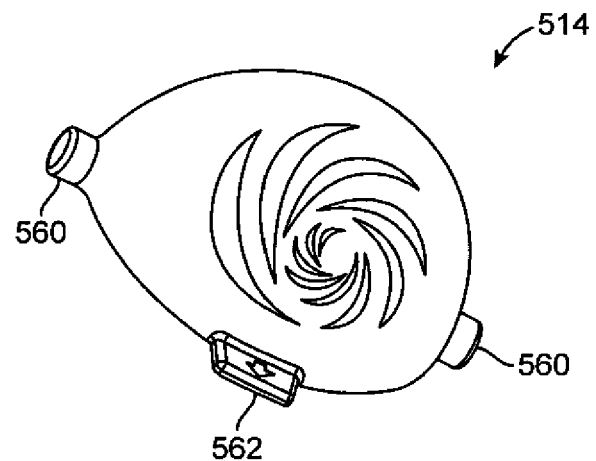
FIG. 16 is a top perspective view of the obturator of the tap and aerator apparatus of FIG. 9.
Figure 17:
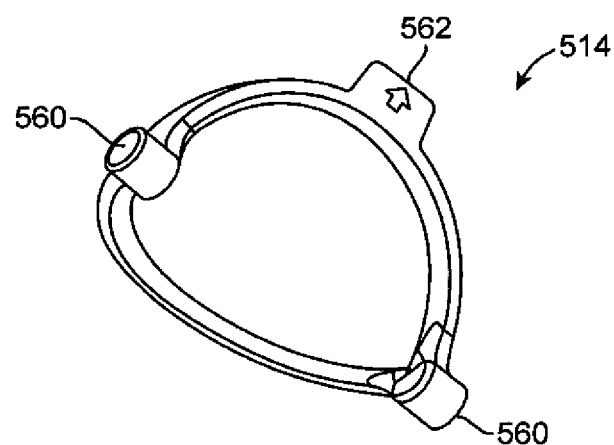
FIG. 17 is a bottom perspective view of the obturator of the tap and aerator apparatus of FIG. 9.

FIGS. 10, 16 and 17 show the obturator 514, which can be pivoted to regulate the level of aeration provided between a level in which essentially no aeration is provided to a level of maximum aeration, with a variety of intermediate levels of aeration available therebetween. In particular, the obturator 514 includes a pair of axle portions 560 that are configured and arranged to be seated upon the lower bearing surfaces 556 (FIG. 15) of the plug valve portion so that the obturator 514 can be pivoted by the user via the finger tab 562.

Turning now to FIGS. 9, 10, 18 and 19, the basic configuration of the crown member 516 will be discussed. The crown member 516 is configured and arranged to be seated on the plug valve portion 510, and it is also configured and arranged to keep the obturator 514 in position within the apparatus 500. The crown member 516 includes a pair of legs 564 that are configured and arranged to mate with the channels 566 (FIGS. 14 and 15) formed within the plug valve portion 510. It should be noted that the channels 566 (FIGS. 14 and 15) are formed radially inwardly of the inwardly projecting tabs 534 (FIGS. 14 and 15), and thus when the legs 564 of the crown member 516 are mated with the channels 566, the legs 564 do not block the tabs 534 from being slidably seated within the inclined grooves 532 (FIGS. 9-11) of the body portion 508.

Figure 18:
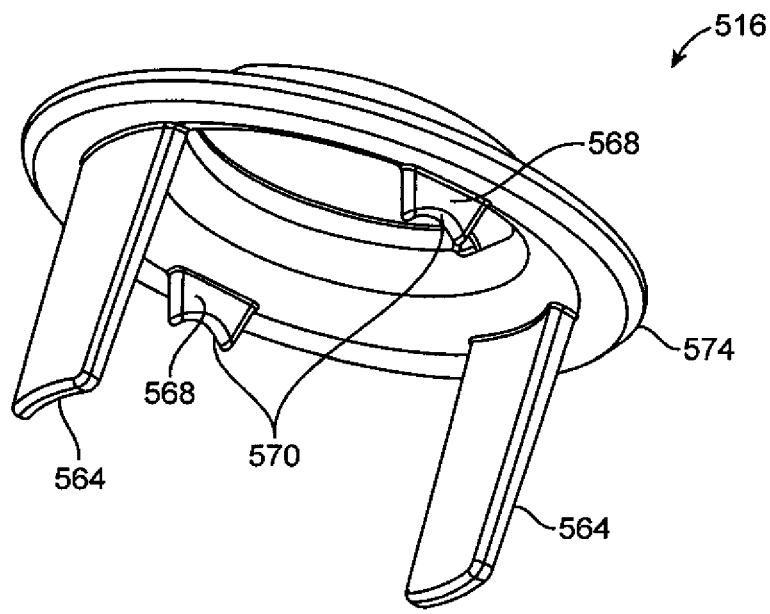
FIG. 18 is a bottom side perspective view of the crown member of the tap and aerator apparatus of FIG. 9.
Figure 19:
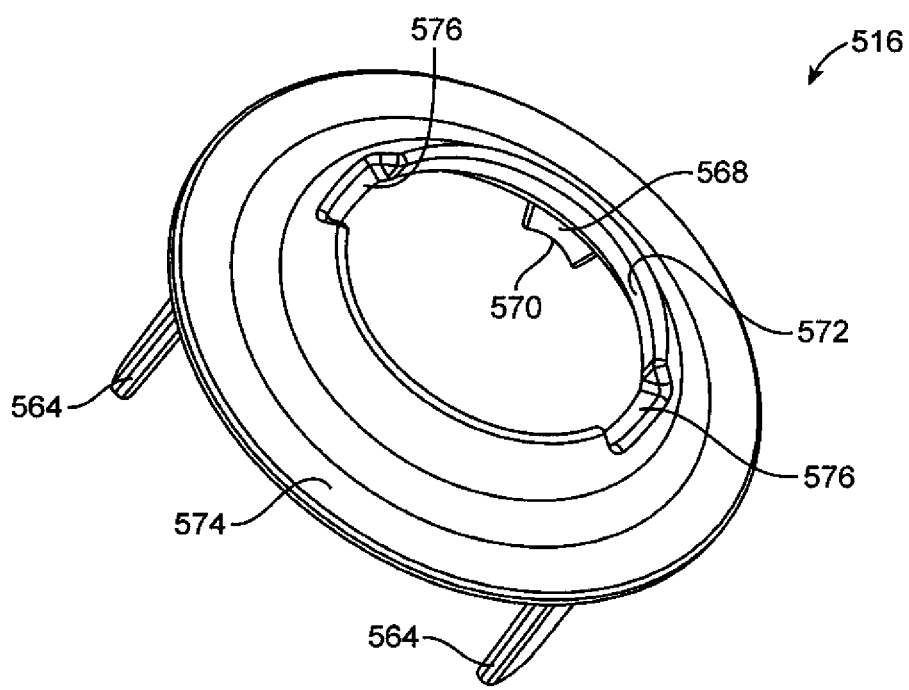
FIG. 19 is a top perspective view of the crown member of the tap and aerator apparatus of FIG. 9.
Figure 20:
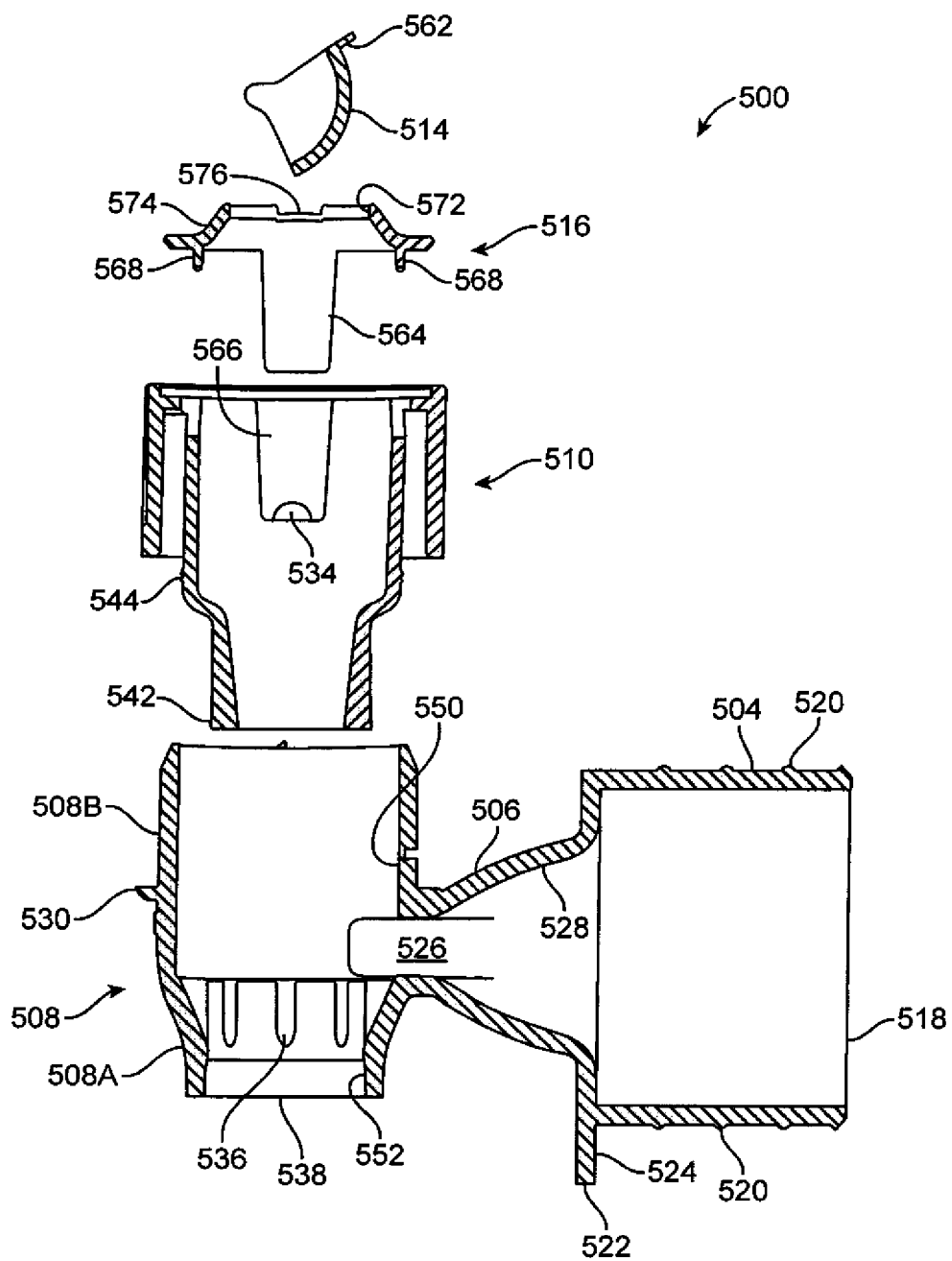
FIG. 20 is an exploded cross-sectional side view of the tap and aerator apparatus of FIG. 9.

FIGS. 18 and 19 also show that the crown member 516 includes a pair of ears 568 that extend downwardly from a ring-like body portion 574. The lowermost surfaces of the ears 568 can be considered as upper bearing surfaces 570 for bearing upon the top surfaces of the axle portions 560 (FIGS. 16 and 17) of the obturator 514. Thus, the upper bearing surfaces 570 of the ears 568 of the crown member 516 (FIGS. 18 and 19) cooperate with the lower bearing surfaces 556 (FIGS. 14 and 15) of the plug valve portion 510 to completely surround and support the axle portions 560 (FIGS. 16 and 17) of the obturator 514 so that the obturator 514 can be pivoted with respect to the plug valve portion 510 to adjust the amount of aeration.

The crown member 516 also includes a central opening 572, and preferably there are two notches 576 within the central opening 572 for receiving the finger tab 562 of the obturator 514 (FIGS. 10, 16 and 17), with one notch being configured for receiving the finger tab 562 when the obturator 514 is pivoted to the fully open position, and with the other notch being configured for receiving the finger tab 562 when the obturator 514 is pivoted to the fully closed position.

Figure 21:
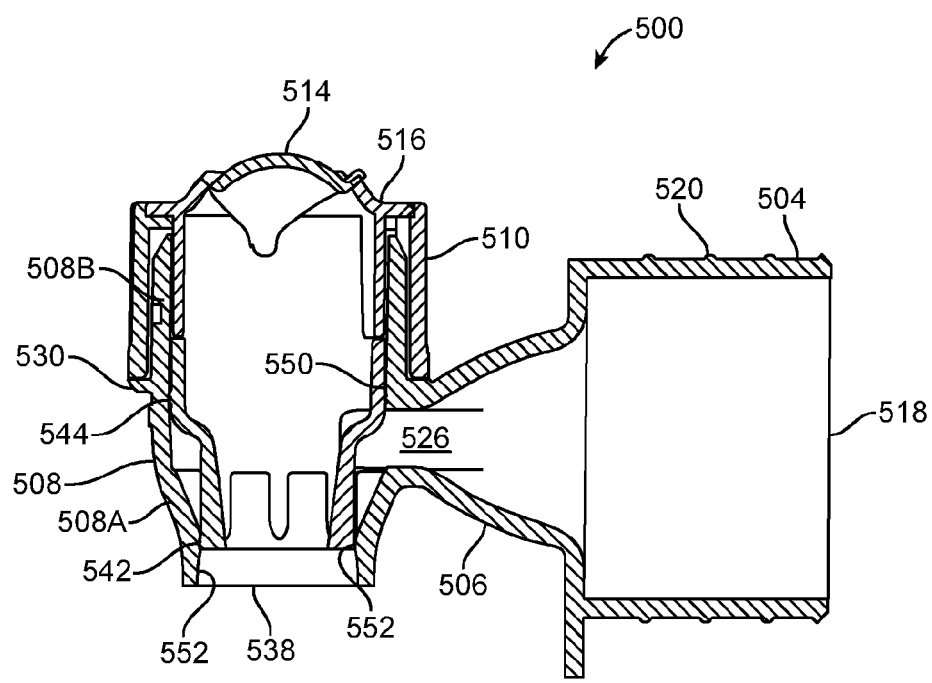
FIG. 21 is a cross-sectional side view of the tap and aerator apparatus of FIG. 9, shown with the plug valve in the closed position and the obturator in the closed position.
Figure 22:
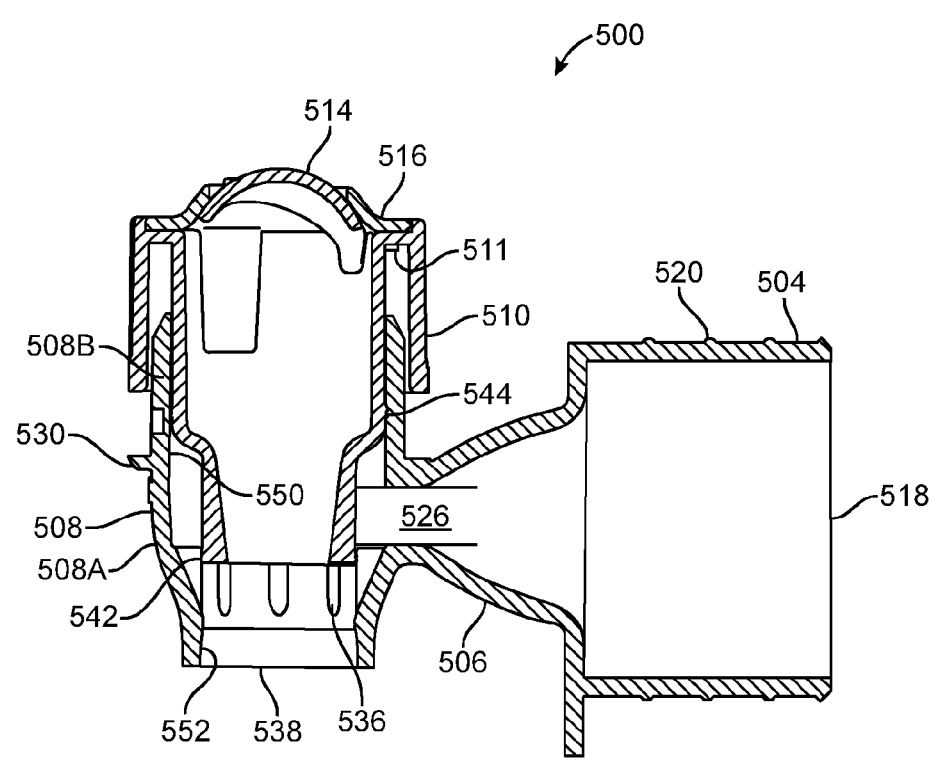
FIG. 22 is a cross-sectional side view of the tap and aerator apparatus of FIG. 9, shown with the plug valve in the open position and the obturator in the closed position.
Figure 23:
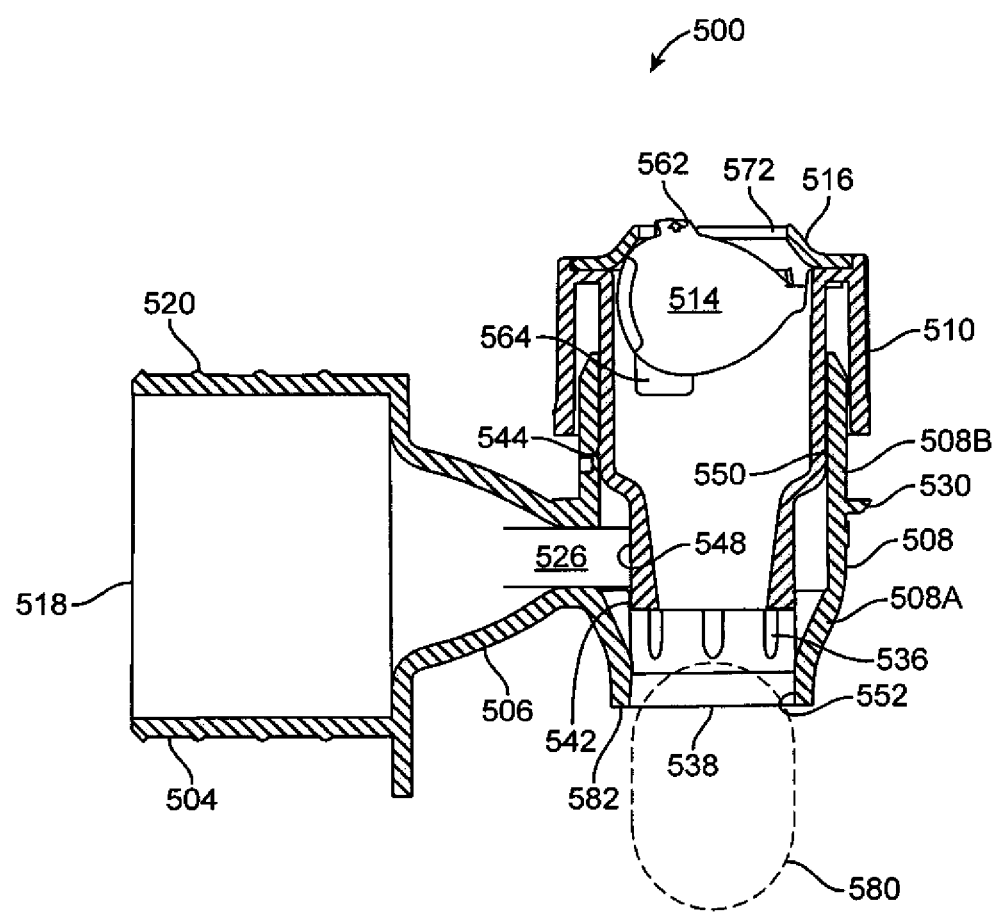
FIG. 23 is a cross-sectional side view of the tap and aerator apparatus of FIG. 9, shown with the plug valve in the open position and the obturator in the open position.

Turning now to the cross-sectional views of FIGS. 20-23, the operation of this embodiment of the tap and aerator apparatus 500 will be described. Briefly, with regard to FIGS. 20-23, FIG. 20 depicts an exploded cross-sectional view of the apparatus 500; FIG. 21 depicts a cross-sectional view with the plug valve portion 510 lowered into the closed position; FIG. 22 depicts a cross-sectional view with the plug valve portion 510 raised into the open position, and with the obturator 514 in the closed position; and FIG. 23 depicts a cross-sectional view (from the opposite side as the FIG. 22 view) with the plug valve portion 510 raised into the open position, and with the obturator 514 also in the open position to allow for maximum aeration.

In operation, the tap and aerator apparatus 500, which has been installed upon a container (such as container 802 of FIG. 8) by inserting the container coupling portion 504 into a relatively rigid, cylindrical filling neck that passes through a bag-like member holding the liquid (such as wine), as known in the art, is preferably originally provided in the closed position (FIG. 21) to prevent the wine, or other liquid, from passing through the apparatus 500. In particular, FIG. 21 shows, in cross-section, that the apparatus 500 is in the closed position in which the plug valve portion 510 is in the lowermost position with respect to the body portion 508 and in which the lower sealing bead(s) 542 is/are in sealing contact with the lower interior peripheral portion 552 of the lower body portion 508A at an area below the lowermost outlets of the flow channels 536 (FIG. 20), and the upper sealing bead(s) is/are in sealing contact with the upper interior peripheral portion 550 of the upper body portion 508B. Thus, fluid passing from the bag-like member into the liquid inlet portion 518 and through the hollow interior portion 526 is contained within the body portion 508, and does not pass outwardly through the liquid outlet portion 538. It should be noted that in this closed position, the fluid does pass into each of the flow channels 536 (FIG. 20), but because the lower sealing bead(s) sealingly contact(s) the lower interior peripheral portion 552 of the body portion 508 at an area below the lowermost edge of the flow channels 536, the fluid is contained within the body portion 508.

FIG. 22 shows the apparatus 500 in the open position, which is a condition achieved by rotating the plug valve portion 510 with respect to the body portion 508, whereby such rotation, which in this embodiment is in the counter-clockwise direction (when considered from above), enables each of the pair of inwardly projecting tabs 534 (FIG. 15) of the plug valve portion 510 to slide in an upward and inclined direction along an associated one of the inclined grooves 532 (FIG. 10) on the upper body portion 508B, thereby raising the plug valve portion 510 with respect to the body portion 508. Such rotation of the plug valve portion 510 is facilitated by grasping the ridges 554 (FIG. 13), which enable the user to have a more secure grip upon the plug valve portion 510.

When the apparatus 500 is in the open position of FIG. 22, the lower sealing bead(s) is/are no longer in full sealing contact with the lower interior peripheral portion 550 of the body portion 508. Instead, although the lower sealing bead (s) is/are still in contact with the inner radial peripheral portion of the annular interior flange 540 (FIG. 11), the fluid from the hollow interior portion 526 is free to flow downwardly through the flow channels 536 and then out through the liquid outlet portion 538.

While some aeration to the fluid flowing through apparatus 500 will occur when the obturator 514 is closed (as in FIG. 22), maximum aeration is obtained when the obturator 514 is fully opened (as in FIG. 23), and intermediate aeration can be obtained with the obturator positioned at any one of various intermediate points between fully opened and fully closed. As mentioned above, the user can vary the position of the obturator 514 by lifting or pushing the finger tab 562 in the appropriate direction so that the obturator 514 pivots about an axis defined by the axle portions 560 (FIGS. 10, 16 and 17).

When the valve is the open position, such as in FIG. 23, the fluid (such as wine) flows through the flow channels 536 in a constricted manner, thereby increasing its velocity, which creates a lower pressure area below the plug valve portion 510. This lower pressure area generates a suction force that pulls the air within the plug valve portion 510 downstream. Also, air entering the plug valve portion 510 through the central opening 572 (which can be considered as an air inlet portion) is also drawn downstream. Such lower pressure area and suction force are created by a combination of Bernoulli's principle and the Venturi effect. Thus, the mixing of the liquid (such as wine) and the air aerates the liquid (wine). The mixing intensity can be varied at the design stage by varying the size, shape, spacing, and the number of flow channels in the array of flow channels. The amount of aeration can also be varied in the finished product by the user by adjusting the degree that the obturator is opened, and by adjusting how much of the flow channels 536 are exposed/blocked by the lower cylindrical portion 548 of the plug valve portion 510 by rotating the plug valve portion 510 to be raised/lowered to an intermediate point between the fully open and fully closed positions.

In the embodiment of FIG. 23, the aeration of the fluid occurs in what will be defined as an aeration and bubble region 580. In particular, when the plug valve portion 510 is in the open position (or a partially open position), the fluid that has been diverged through the separate flow channels 536 reconnects when enough of the angled channel is exposed to allow the liquid to be dispensed through the liquid outlet portion. As mentioned above, a low-pressure environment is created at the bases of the flow channels 536, producing suction and a turbulent bubble within the aeration and bubble region 580. The fluid hangs on the lower interior peripheral portion 552 of the body portion 508 until passing the lower edge 582 of the body portion 508, where the interior of the body portion produces a thin wall of fluid that ultimately reconnects downstream within the aeration and bubble region 580. In other words, the mixing, or aeration, of the fluid (wine) and air occurs in the aeration and bubble region 580.

One of the other benefits of the embodiment depicted in FIGS. 9-23, as well as some of the other embodiments, is that the present configuration only permits a small amount of fluid to remain on the apparatus 500 after the plug valve portion 510 has been rotated from the open position to the closed position, thereby the amount of dripping of the leftover fluid from the bottom of the tap is reduced (or essentially eliminated). Specifically, due to the combination of structural features, and the functional features related to the fluid flow created by the structural features, only a small amount of fluid remains on the lower interior peripheral portion 552 of the body portion 508 after the plug valve portion 510 is moved into the closed position (FIG. 21) since the only area that the liquid can adhere to is the area of the lower interior peripheral portion 552 that is below the lowermost edge of the lower cylindrical portion 548 of the plug valve portion 510, which area is relatively small. Further, the bubble created when the plug valve portion 510 is in the open position (FIG. 23) and the liquid is being dispensed pops when the plug valve portion 510 is moved into the closed position (FIG. 21), and thus the bulk of the remaining liquid falls from the device at such popping of the bubble.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiments have been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. In other words, it is contemplated that features from different embodiments can be combined, resulting in additional embodiments not depicted, but easily understood by those of ordinary skill in the art. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A tap and aerator apparatus comprising:
    a container coupling portion including a liquid inlet portion;
    a body portion including a liquid outlet portion, wherein said liquid outlet portion is in fluid communication with said liquid inlet portion of said container coupling portion;
    a plug valve portion configured and arranged to be seated within said body portion, wherein said plug valve portion is configured and arranged to be moved relative to said body portion between an open position, in which a liquid is free to flow from said liquid inlet portion and out through said liquid outlet portion, and a closed position, in which liquid from said liquid inlet portion is prevented from flowing out through said liquid outlet portion; and
    an aerator for selectively regulating airflow into said body portion, wherein said aerator includes a central opening that is configured and arranged as an air inlet portion,
    wherein said body portion includes a plurality of flow channels provided in an interior surface thereof, and further wherein each of said flow channels is comprised of an open groove formed within the interior surface of said body portion,
    wherein said plug valve portion includes an opening extending therethrough, wherein said opening of said plug valve portion includes an upper portion in fluid communication with said central opening of said aerator and a lower portion that is in fluid communication with said liquid outlet portion of said body portion,
    wherein said plug valve portion includes at least one first sealing bead on an outer periphery thereof and at least one second sealing bead on the outer periphery thereof,
    wherein when said plug valve portion is in said closed position, said at least one first sealing bead makes sealing contact with an inner peripheral portion of said body portion at a first area and said at least one second sealing bead makes sealing contact with the inner peripheral portion of said body portion at a second area,
    wherein when said plug valve portion is in said closed position, said flow channels are entirely located between said at least one first sealing bead and said at least one second sealing bead, and
    wherein lowermost outlets of each of said flow channels are separated from a lowermost edge of said liquid outlet portion of said body portion.

2. The tap and aerator apparatus according to claim 1, wherein when said plug valve portion is in said closed position, said at least one second sealing bead prevents said liquid from flowing out through said outlet portion.

3. The tap and aerator apparatus according to claim 1, further comprising:
    a bridging portion between said container coupling portion and said body portion, wherein said bridging portion includes a bridging passageway therein configured and arranged to allow liquid to flow from said container coupling portion to said body portion.

4. The tap and aerator apparatus according to claim 3, wherein said first area is above the area where the bridging passageway connects with said body portion and said second area is below the area where the bridging passageway connects with said body portion.

5. The tap and aerator apparatus according to claim 1, wherein said plug valve portion is configured and arranged to be rotated with respect to said body portion between said open position and said closed position.

6. The tap and aerator apparatus according to claim 1, wherein:
said plug valve portion includes a pair of inwardly projecting tabs; and
said body portion includes a pair of grooves that are configured and arranged to cooperate with a pair of inwardly projecting tabs such that said plug valve portion can be rotated with respect to said body portion between said open position and said closed position.

7. The tap and aerator apparatus according to claim 1, wherein said body portion includes an annular shoulder portion formed on an interior thereof, and further wherein said plurality of flow channels pass through said shoulder portion.

8. The tap and aerator apparatus according to claim 1, wherein said aerator comprises an obturator that is configured and arranged to be pivoted with respect to said plug valve portion to adjust the amount of aeration.

9. A tap apparatus comprising:
a container coupling portion including a liquid inlet portion;
a body portion including a liquid outlet portion, wherein said liquid outlet portion is in fluid communication with said liquid inlet portion of said container coupling portion;
a plug valve portion configured and arranged to be seated within said body portion, wherein said plug valve portion is configured and arranged to be moved relative to said body portion between an open position, in which a liquid is free to flow from said liquid inlet portion and out through said liquid outlet portion, and a closed position, in which liquid from said liquid inlet portion is prevented from flowing out through said liquid outlet portion; and
an aerator for selectively regulating airflow into said body portion, wherein said aerator includes a central opening that is configured and arranged as an air inlet portion,
wherein said body portion includes a plurality of flow channels provided in an interior surface thereof, and further wherein each of said flow channels is comprised of an open groove formed within the interior surface of said body portion,
wherein said plug valve portion includes at least one first sealing bead on an outer periphery thereof and at least one second sealing bead on the outer periphery thereof,
wherein said plug valve portion includes an opening extending therethrough, wherein said opening of said plug valve portion includes an upper portion in fluid communication with said central opening of said aerator and a lower portion that is in fluid communication with said liquid outlet portion of said body portion,
wherein when said plug valve portion is in said closed position, said at least one first sealing bead makes sealing contact with an inner peripheral portion of said body portion at a first area and said at least one second sealing bead makes sealing contact with the inner peripheral portion of said body portion at a second area,
wherein said flow channels are entirely located between said first area of said body portion and said second area of said body portion, and
wherein lowermost outlets of each of said flow channels are separated from a lowermost edge of said liquid outlet portion of said body portion.

10. The tap apparatus according to claim 9, wherein when said plug valve portion is in said closed position, said at least one second sealing bead prevents said liquid from flowing out through said outlet portion.

11. The tap apparatus according to claim 9, further comprising:
a bridging portion between said container coupling portion and said body portion, wherein said bridging portion includes a bridging passageway therein configured and arranged to allow liquid to flow from said container coupling portion to said body portion.

12. The tap apparatus according to claim 11, wherein said first area is above the area where the bridging passageway connects with said body portion and said second area is below the area where the bridging passageway connects with said body portion.

13. The tap apparatus according to claim 9, wherein said plug valve portion is configured and arranged to be rotated with respect to said body portion between said open position and said closed position.

14. The tap apparatus according to claim 9, wherein:
said plug valve portion includes a pair of inwardly projecting tabs; and
said body portion includes a pair of grooves that are configured and arranged to cooperate with a pair of inwardly projecting tabs such that said plug valve portion can be rotated with respect to said body portion between said open position and said closed position.

15. The tap apparatus according to claim 9, wherein said body portion includes an annular shoulder portion formed on an interior thereof, and further wherein said plurality of flow channels pass through said shoulder portion.

16. A tap and aerator apparatus comprising:
a container coupling portion including a liquid inlet portion;
a body portion including a liquid outlet portion, wherein said liquid outlet portion is in fluid communication with said liquid inlet portion of said container coupling portion;
a plug valve portion configured and arranged to be seated within said body portion, wherein said plug valve portion is configured and arranged to be moved relative to said body portion between an open position, in which a liquid is free to flow from said liquid inlet portion and out through said liquid outlet portion, and a closed position, in which liquid from said liquid inlet portion is prevented from flowing out through said liquid outlet portion;
a bridging portion between said container coupling portion and said body portion, wherein said bridging portion includes a bridging passageway therein configured and arranged to allow liquid to flow from said container coupling portion to said body portion; and
an aerator for selectively regulating airflow into said body portion, wherein said aerator comprises a cap that is configured and arranged to adjust the amount of aeration, wherein said aerator includes a central opening that is configured and arranged as an air inlet portion,
wherein said body portion includes a plurality of flow channels provided in an interior surface thereof, and further wherein each of said flow channels is comprised of an open groove formed within the interior surface of said body portion, wherein said body portion includes a first sealing area that is above the area where the bridging passageway connects with said body portion and a second sealing area that is below the area where the bridging passageway connects with said body portion, and wherein said flow channels are entirely located between said first sealing area and said second sealing area, and wherein lowermost outlets of each of said flow channels are separated from a lowermost edge of said liquid outlet portion of said body portion, and wherein said plug valve portion includes an opening extending therethrough, wherein said opening of said plug valve portion includes an upper portion in fluid communication with said central opening of said aerator and a lower portion that is in fluid communication with said liquid outlet portion of said body portion.

17. The tap and aerator apparatus according to claim 16, wherein said cap includes a pair of axle portions that define an axis, and further wherein the cap is configured and arranged to be pivoted about the axis such that opening the cap moves a portion of the cap into a space defined within the apparatus.

18. The tap and aerator apparatus according to claim 16, wherein:

said plug valve includes at least one first sealing bead on an outer periphery thereof and at least one second sealing bead on the outer periphery thereof, and when said plug valve is in said closed position, said at least one first sealing bead makes sealing contact with an inner peripheral portion of said body portion at said first sealing area and said at least one second sealing bead makes sealing contact with the inner peripheral portion of said body portion at said second sealing area, and when said plug valve is in said open position, said at least one first sealing bead remains in sealing contact with the inner peripheral portion of said body portion at the first sealing area and said at least one second sealing bead is out of sealing contact with the inner peripheral portion of said body portion at the second sealing area.

* * * * *